US009785834B2

(12) United States Patent
Biswas et al.

(10) Patent No.: US 9,785,834 B2
(45) Date of Patent: Oct. 10, 2017

(54) METHODS AND SYSTEMS FOR INDEXING MULTIMEDIA CONTENT

(71) Applicant: XEROX CORPORATION, Norwalk, CT (US)

(72) Inventors: Arijit Biswas, Kolkata (IN); Harish Arsikere, Bangalore (IN); Kundan Shrivastava, Bangalore (IN); Om D Deshmukh, Bangalore (IN)

(73) Assignee: VIDEOKEN, INC., Newark, DE (US)

( * ) Notice: Subject to any disclaimer, the term of this patent is extended or adjusted under 35 U.S.C. 154(b) by 128 days.

(21) Appl. No.: 14/798,499

(22) Filed: Jul. 14, 2015

(65) Prior Publication Data

US 2017/0017838 A1    Jan. 19, 2017

(51) Int. Cl.
*G06K 9/00* (2006.01)
*G06F 17/30* (2006.01)

(52) U.S. Cl.
CPC ..... *G06K 9/00577* (2013.01); *G06F 17/3079* (2013.01)

(58) Field of Classification Search
None
See application file for complete search history.

(56) References Cited

U.S. PATENT DOCUMENTS

| | | | |
|---|---|---|---|
| 5,969,755 A * | 10/1999 | Courtney | G06F 17/3079 348/135 |
| 8,612,211 B1 | 12/2013 | Shires et al. | |
| 2002/0157116 A1 | 10/2002 | Jasinschi | |
| 2003/0086409 A1 | 5/2003 | Karas | |
| 2005/0022252 A1 | 1/2005 | Shen | |
| 2005/0283752 A1 * | 12/2005 | Fruchter | G06F 17/3079 717/100 |
| 2011/0099195 A1 | 4/2011 | Patwardhan et al. | |
| 2012/0324491 A1 * | 12/2012 | Bathiche | H04H 60/33 725/10 |
| 2013/0094771 A1 | 4/2013 | Chaudhuri et al. | |
| 2014/0245152 A1 | 8/2014 | Carter et al. | |

OTHER PUBLICATIONS

Lindsay Ryan, MOOCs are on the Move: A Snapshot of the Rapid Growth of MOOCs, https://www.efmd.org/index.php/blog/view/250-white-paper-moocs-massive-open-online-courses.

* cited by examiner

*Primary Examiner* — Atiba O Fitzpatrick
(74) *Attorney, Agent, or Firm* — LeonardPatel PC

(57) ABSTRACT

According to embodiments illustrated herein, a method and system is provided for indexing a multimedia content. The method includes extracting, by one or more processors, a set of frames from the multimedia content, wherein the set of frames comprises at least one of a human object and an inanimate object. Thereafter, a body language information pertaining to the human object is determined from the set of frames by utilizing one or more image processing techniques. Further, an interaction information is determined from the set of frames. The interaction information is indicative of an action performed by the human object on the inanimate object. Thereafter, the multimedia content is indexed in a content database based at least on the body language information and the interaction information.

20 Claims, 9 Drawing Sheets

METHODS AND SYSTEMS FOR INDEXING MULTIMEDIA CONTENT

TECHNICAL FIELD

The presently disclosed embodiments are related, in general, to data processing. More particularly, the presently disclosed embodiments are related to methods and systems for indexing multimedia content.

BACKGROUND

Typically, a database/content repository may store a large amount of data in the form of files of various types such as, but not limited to, electronic documents, multimedia files, image files, audio/music files, and so on. Efficient retrieval of content from the database/content repository may require indexing of the files stored in the databases/content repository. Typically, the database/content repository may index the files based on various attributes associated with the files such as, but not limited to, a file type, a file size, a file name, a hash code (e.g., Cyclic Redundancy Check (CRC) Code), and so on. However, to perform efficient natural language search on the files, the database/content repository may be required to index the files based on content within the files. Performing such content-based indexing on the multimedia files may be a non-trivial task.

SUMMARY

According to embodiments illustrated herein, there is provided a method for indexing a multimedia content. The method includes extracting, by one or more processors, a set of frames from the multimedia content, wherein the set of frames comprises at least one of a human object and an inanimate object. Thereafter, a body language information pertaining to the human object is determined from the set of frames by utilizing one or more image processing techniques. Further, an interaction information is determined from the set of frames. The interaction information is indicative of an action performed by the human object on the inanimate object. Thereafter, the multimedia content is indexed in a content database based at least on the body language information and the interaction information.

According to embodiments illustrated herein, there is provided a system for indexing a multimedia content. The system includes one or more processors configured to extract a set of frames from the multimedia content, wherein the set of frames comprises at least one of a human object and an inanimate object. Thereafter, a body language information pertaining to the human object is determined from the set of frames by utilizing one or more image processing techniques. Further, an interaction information is determined from the set of frames. The interaction information is indicative of an action performed by the human object on the inanimate object. Thereafter, the multimedia content is indexed in a content database based at least on the body language information and the interaction information.

According to embodiments illustrated herein, there is provided a computer program product for use with a computing device. The computer program product includes a non-transitory computer readable medium. The non-transitory computer readable medium stores a computer program code for indexing a multimedia content. The computer program code is executable by one or more micro-processors in the computing device to extract a set of frames from the multimedia content, wherein the set of frames comprises at least one of a human object and an inanimate object. Thereafter, a body language information pertaining to the human object is determined from the set of frames by utilizing one or more image processing techniques. Further, an interaction information is determined from the set of frames. The interaction information is indicative of an action performed by the human object on the inanimate object. Thereafter, the multimedia content is indexed in a content database based at least on the body language information and the interaction information.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
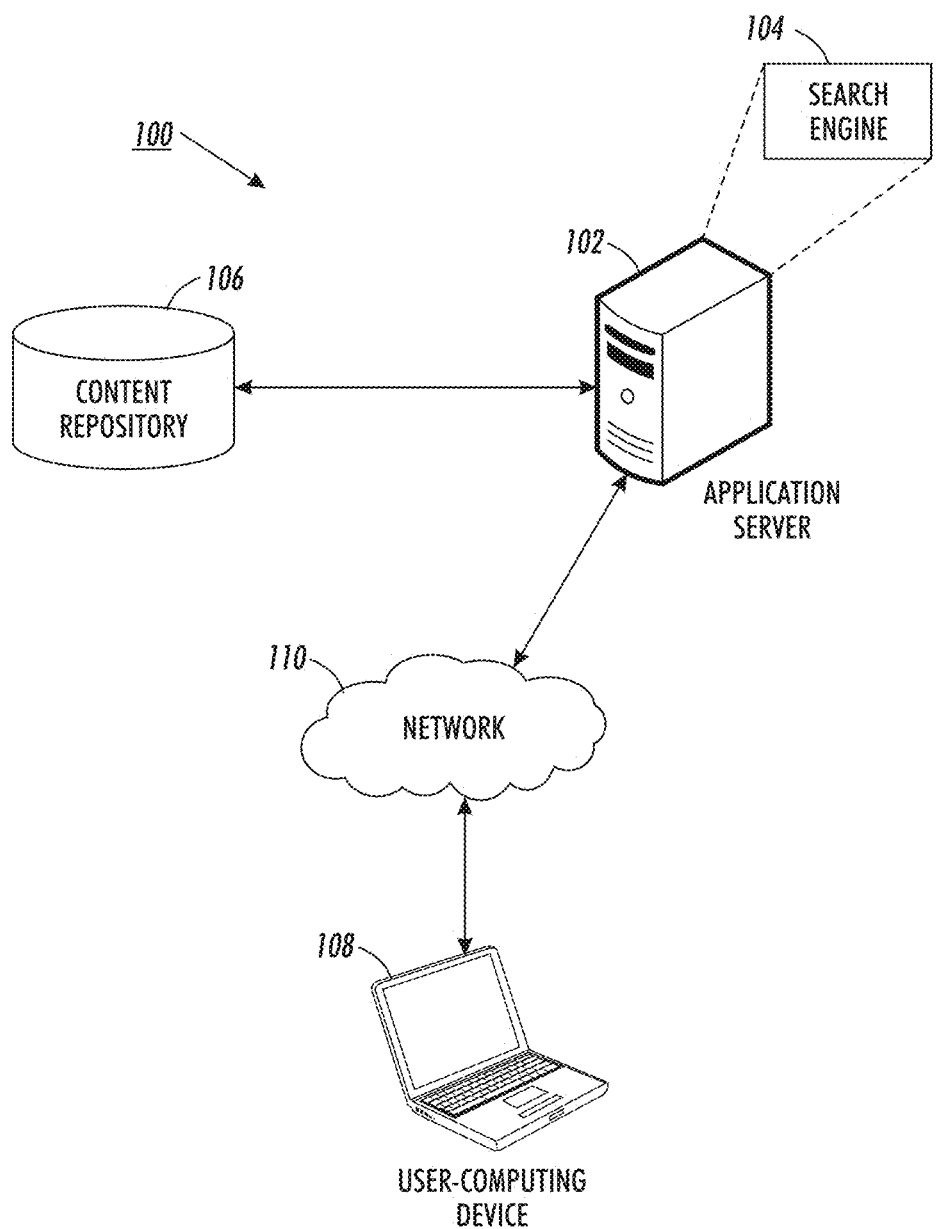
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "multimedia content" refers to at least one of, but not limited to, audio, video, text, image, or animation. In an embodiment, the multimedia content may be played through a media player such as VLC Media Player, Windows Media Player, Adobe Flash Player, Apple QuickTime Player, etc., on a computing device. In an embodiment, the multimedia content may be downloaded or streamed from a multimedia server to the computing device. In an alternate embodiment, the multimedia content may be stored on a media storage device such as Hard Disk Drive, CD Drive, Pen Drive, etc., connected to (or inbuilt within) the computing device.

A "frame" refers to a portion or a snippet of a multimedia content. In an embodiment, the frame may correspond to a snapshot at a particular time instance within the multimedia content. In an embodiment, the frame may be encoded in accordance to one or more encoding algorithms such as, but not limited to, MPEG4, AVI, etc.

A "set of frames" refers to a group of frames in a multimedia content that include at least one of a human object or an inanimate object. In an embodiment, the set of frames may be extracted from the multimedia content using one or more image processing techniques such as, but not limited to, one or more facial detection techniques, one or more pattern detection techniques, one or more edge/contour/ridge detection techniques, one or more histogram analysis techniques, or any other image processing techniques known in the art.

A "human object" refers to an individual captured within a set of frames of a multimedia content. A person skilled in the art will understand that the human object may also include one or more of, but not limited to, an animated character, a cartoon character, or any other fictitious animated character in the multimedia content. In an embodiment, the human object may remain active in the multimedia content. In an embodiment, the human object may interact with an inanimate object in the multimedia content by performing one or more actions on the inanimate object.

An "inanimate object" refers to any object other than a human object, captured in a set of frames of a multimedia content. In an embodiment, the inanimate object may remain passive in the multimedia content. In an embodiment, the inanimate object may include, but is not limited to, a presentation slide, a writing board, a poster, a paper, or a prop/model.

An "interaction" refers to an action performed by a human object on an inanimate object in the multimedia content. In an embodiment, examples of the action performed by the human object on the inanimate object include, but are not limited to, the human object writing on the inanimate object, the human object pointing towards or touching the inanimate object, the human object holding the inanimate object, the human object scrolling through a textual content on the inanimate object, or the human object modifying/highlighting the textual content on the inanimate object.

A "body language" refers to a non-verbal message, a feeling, a thought, or an intention conveyed by a human object in the multimedia content. In an embodiment, the body language may be determined based on one or more of, but not limited to, a hand motion of the human object in the multimedia content, a body motion of the human object, a facial expression/emotion of the human object, a proximity of the human object to a video capturing device utilized for creation of the multimedia content, or an eye contact of the human object towards the video capturing device.

FIG. 1 is a block diagram of a system environment 100, in which various embodiments can be implemented. The system environment 100 includes an application server 102, a search engine 104, a content repository 106, a user-computing device 108, and a network 110.

In an embodiment, the application server 102 refers to a computing device or a software framework hosting an application or a software service. In an embodiment, the application server 102 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the application server 102 may be configured to index a multimedia content within the content repository 106. In an embodiment, the multimedia content includes one or more of an educational lecture, a corporate e-learning module (ELM), or a marketing/promotional video. In an embodiment, the application server 102 may extract a set of frames from the multimedia content, such that the set of frames comprises at least one of a human object and an inanimate object. Thereafter, the application server 102 may determine a body language information pertaining to the human object from the set of frames by utilizing one or more image processing techniques. Further, the application server 102 may determine an interaction information from the set of frames, such that the interaction information indicates an action performed by the human object on the inanimate object. In an embodiment, the application server 102 may index the multimedia content in the content repository based at least on the determined body language information and the interaction information.

Further, in an embodiment, the application server 102 may analyze the multimedia content to determine an emotion information indicative of an emotion presented by the human object in the multimedia content. In an embodiment, the application server 102 may determine the emotion information by utilizing one or more of one or more image processing techniques, one or more speech/audio processing techniques, or one or more natural language processing techniques. The multimedia content may be further indexed by the application server 102 based on the emotion information.

In addition, in an embodiment, the application server 102 may analyze an audio content in the multimedia content by utilizing one or more speech/audio processing techniques to determine an audio characteristics information. The audio characteristics information may comprise one or more of a speech rate, an accent, a speaking style, a background audio, or a background noise. The multimedia content may be further indexed by the application server 102 based on the audio characteristics information.

Further, in an embodiment, the application server 102 may determine a first textual content and a second textual content from the multimedia content. The application server 102 may determine the first textual content using one or more text recognition techniques. For example, the first textual content may include a textual content on the inanimate object, a close-captioned text in the multimedia content, and so forth. On the other hand, the application server 102 may determine the second textual content from an audio content in the multimedia content by utilizing one or more speech-to-text conversion techniques. Thus, the second textual content may correspond to a textual transcription of a speech/audio/voice in the multimedia content. Based on the first textual content and the second textual content, the application server 102 may determine a discourse rate associated with the multimedia content. For example, the discourse rate may correspond to a ratio of a number of words in the second textual content to a number of words in the first textual content. The multimedia content may be further indexed by the application server 102 based on the discourse rate associated with the multimedia content.

In addition, in an embodiment, the application server 102 may extract one or more keywords from the first textual content and the second textual content by utilizing one or more natural language processing techniques. The one or more keywords may relate to one or more concepts explained in/covered in the multimedia content. Thus, the application server 102 may determine the one or more concepts explained in/covered in the multimedia content based on the one or more keywords. Thereafter, the application server 102 may determine a number of repetitions of the one or more concepts in the multimedia content. The multimedia content may be further indexed by the application server 102 based one or more of the one or more concepts or the number of repetitions of the one or more concepts.

Further, in an embodiment, the application server 102 may determine a personality type associated with the human object based on one or more of the body language information, the interaction information, the emotion information, the speech rate of the human object, the speaking style of the human object, or the second textual content determined from the audio content in the multimedia content. The multimedia content may be further indexed by the application server 102 based on the personality type associated with the human object.

Thus, a person skilled in the art will understand that the multimedia content may be indexed by the application server 102 based on the emotion information, the audio characteristics information, the discourse rate, the one or more concepts in the multimedia content, the number of repetitions of the one or more concepts, the personality type of the human object, or any combination thereof; in addition to the body language information and the interaction information.

Further, in an embodiment, the application server 102 may host a search engine 104 as a computer program code stored in the memory of the application server 102, which is executable by a processor of the application server 102 to perform a predetermined operation. In an embodiment, the search engine 104 may be configured to retrieve a multimedia content from the content repository 106. In an embodiment, the search engine 104 may receive a search query from the user-computing device 108 through the application server 102. The search query may include a search criteria provided by a user of the user-computing device 108. In an embodiment, the search engine 104 may utilize the search criteria to retrieve the multimedia content from the content repository 106 based on the indexing of the multimedia content in the content repository 106. For instance, the search criteria may be represented as "{Body Language=Open and Expressive, Interaction=Medium interaction level, Accent=US English}." In such a scenario, the search engine 104 may retrieve such a multimedia content from the content repository 106 in which a human object is open and expressive, has a medium level of interactivity with an inanimate object, and speaks in a US English accent. As the application server 102 may have previously indexed the multimedia content based on various factors associated with the multimedia content such as body language information, interaction information, and accent of the human object, the retrieval of the multimedia content from the content repository 106 may be performed by comparing the index of the multimedia content with the search criteria in the search query.

The application server 102 may be realized through various types of application servers such as, but not limited to, a Java application server, a .NET framework application server, a Base4 application server, a PHP framework application server, or any other application server framework.

A person with ordinary skill in the art would understand that the scope of the disclosure is not limited to the search engine 104 being hosted by the application server 102. In an embodiment, the search engine 104 may be realized as a separate application server without departing from the spirit of the disclosure.

In an embodiment, the content repository 106 may be configured to store a set of multimedia contents. In an embodiment, the application server 102 may index the set of multimedia contents stored by the content repository 106 based at least one the body language information and the interaction information. In addition, the set of multimedia contents may be further indexed based on the emotion information, the audio characteristics information, the discourse rate, the one or more concepts in the multimedia content, the number of repetitions of the one or more concepts, the personality type of the human object, or a combination thereof. In an embodiment, the content repository 106 may receive a query from the application server 102 and/or the search engine 104 to access/extract at least a multimedia content from the set of multimedia contents stored by the content repository 106. The content repository 106 may be realized as a database server through various technologies such as, but not limited to, Microsoft® SQL Server, Oracle®, IBM DB2®, Microsoft Access®, PostgreSQL®, MySQL® and SQLite®, and the like. In an embodiment, the application server 102 and the search engine 104 may connect to the content repository 106 using one or more protocols such as, but not limited to, Open Database Connectivity (ODBC) protocol and Java Database Connectivity (JDBC) protocol.

A person with ordinary skills in the art would understand that the scope of the disclosure is not limited to the content repository 106 as a separate entity. In an embodiment, the functionalities of the content repository 106 can be integrated into the application server 102.

The user-computing device 108 refers to a computing device used by a user. The user-computing device 108 comprises one or more processors and one or more memories. The one or more memories may include computer readable code that is executable by the one or more processors to perform predetermined operations. In an embodiment, the user-computing device 108 may present a user-interface to the user to receive the search query including the search criteria from the user. The user-computing device 108 may transmit the search query to the search engine 104 (through the application server 102 or otherwise). Based on the search criteria in the search query and the indexing of the set of multimedia content in the content repository 106, a multimedia content may be retrieved by the search engine 104 from the content repository 106. Thereafter, the user-computing device 108 may receive the retrieved multimedia content from the search engine 104 (through the application server 102 or otherwise). The user-computing device 108 may then present the received multimedia content to the user through the user-interface of the user-computing device 108. In an embodiment, the user-computing device 108 may include hardware and software for playing the multimedia content. For example, the user-computing device 108 may include a display device and an audio device to play a video and an audio in the multimedia content. Further, the user-computing device 108 may have a media player software such as, but not limited to, VLC Media Player, Windows Media Player, Adobe Flash Player, Apple QuickTime Player, etc., for playing the multimedia content using the display and the audio devices of the user-computing device 108. Example user-interfaces presented on the user-computing device 108 for displaying the multimedia content to the user have been explained in conjunction with FIGS. 5A-5E.

Examples of the user-computing device 108 include, but are not limited to, a personal computer, a laptop, a personal digital assistant (PDA), a mobile device, a tablet, or any other computing device.

A person having ordinary skill in the art would appreciate that the scope of the disclosure is not limited to realizing the application server 102 and the user-computing device 108 as separate entities. In an embodiment, the application server 102 may be realized as an application program installed on and/or running on the user-computing device 108 without departing from the scope of the disclosure.

The network 110 corresponds to a medium through which content and messages flow between various devices of the system environment 100 (e.g., the application server 102, the content repository 106, and the user-computing device 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
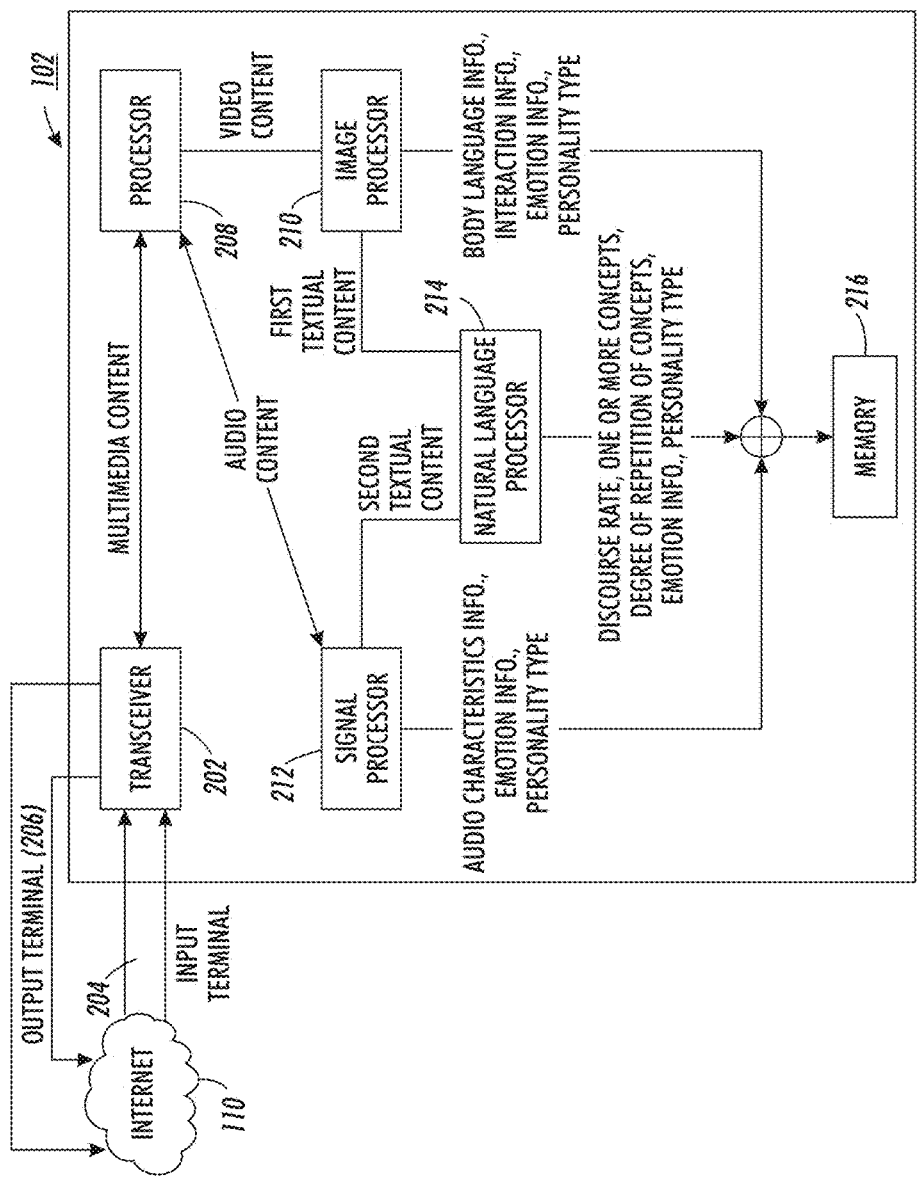
FIG. 2 is a block diagram that illustrates an application server configured for indexing a multimedia content, in accordance with at least one embodiment.

FIG. 2 is a block diagram that illustrates the application server 102 configured for indexing the multimedia content, in accordance with at least one embodiment. In an embodiment, the application server 102 includes a transceiver 202, a processor 208, an image processor 210, a signal processor 212, a natural language processor (NLP) 214, and a memory 216. The processor 208 is coupled to the transceiver 202, the image processor 210, the signal processor 212, the NLP 214, and the memory 216. The transceiver 202 is connected to the network 110 through an input terminal 204 and an output terminal 206.

The transceiver 202 transmits and receives messages and data to/from various components of the system environment 100 over the network 110. In an embodiment, the transceiver 202 is coupled to the input terminal 204 and the output terminal 206 through which the transceiver 202 may receive and transmit data/messages, respectively. For instance, the transceiver 202 may receive the multimedia content from the content repository 106 through the input terminal 204. Further, the transceiver 202 may transmit a metadata associated with the multimedia content to the content repository 106 through the output terminal 206. In an embodiment, the metadata may include at least the body language information and the interaction information associated with the multimedia content. The multimedia content may then be indexed in the content repository 106 based on the metadata associated with the multimedia content, transmitted by the transceiver 202. Examples of the transceiver 202 may include, but are not limited to, an antenna, an Ethernet port, a USB port, or any other port that can be configured to receive and transmit data. The transceiver 202 transmits and receives data/messages in accordance with the various communication protocols such as, TCP/IP, UDP, and 2G, 3G, or 4G communication protocols.

The processor 208 includes suitable logic, circuitry, and/or interfaces that are operable to execute one or more instructions stored in the memory 216 to perform predetermined operations. The processor 208 may be implemented using one or more processor technologies known in the art. Examples of the processor 208 include, but are not limited to, an x86 processor, an ARM processor, a Reduced Instruction Set Computing (RISC) processor, an Application Specific Integrated Circuit (ASIC) processor, a Complex Instruction Set Computing (CISC) processor, or any other processor.

The image processor 210 is a processor configured to perform one or more image processing/analysis operations on an image/video within the multimedia content. In an embodiment, the image processor 210 may include one or more electronic circuits and/or gates configured to perform one or more predefined image processing operations. Examples of the one or more predefined image processing operations include, but are not limited to, an image transformation (e.g., conversion of an image from a spatial domain to a frequency domain and vice versa), an image noise reduction, an image thresholding, an image enhancement, and so on. In an embodiment, the image processor 210 may utilize one or more image processing techniques to extract the set of frames from the multimedia content, which include at least one of the human object and the inanimate object. Further, in an embodiment, the image processor 210 may utilize one or more text recognition techniques to extract the first textual content from the image/video within the multimedia content. Though the image processor 210 is depicted as separate from the processor 208, a person skilled in the art would appreciate that the scope of the disclosure is not limited to realizing the image processor 210 as a separate entity. In an embodiment, the image processor 210 may be implemented within the processor 208 without departing from the spirit of the disclosure. Further, a person skilled in the art will understand that the scope of the disclosure is not limited to realizing the image-processor 210 as a hardware component. In an embodiment, the image processor 210 may be implemented as a software module included in a computer program code (stored in the memory 216), which may be executable by the processor 208 to perform the functionalities of the image processor 210.

The signal processor 212 is a processor configured to perform one or more audio/speech processing/analysis operations on an audio content within the multimedia content. In an embodiment, the signal processor 212 may include one or more electronic circuits and/or gates configured to perform one or more predefined signal-processing operations. Examples of the one or more predefined signal-processing operations include, but are not limited to, a signal transformation (e.g., conversion of a signal from time to frequency domain and vice versa), a noise reduction, a signal filtration, a signal thresholding, a signal attenuation, and so on. In an embodiment, the signal processor 212 may utilize one or more audio/speech processing techniques to determine the audio characteristics information associated with the audio content in the multimedia content. For instance, the signal processor 212 may determine a speech rate, an accent, a speaking style, a background audio, or a background noise, associated with the audio content in the multimedia content. Further, in an embodiment, the signal processor 212 may apply one or more speech-to-text conversion techniques to determine the second textual content from the audio content in the multimedia content. Though the signal processor 212 is depicted as separate from the processor 208, a person skilled in the art would appreciate that the scope of the disclosure is not limited to realizing the signal processor 212 as a separate entity. In an embodiment, the signal processor 212 may be implemented within the processor 208 without departing from the spirit of the disclosure. Further, a person skilled in the art will understand that the scope of the disclosure is not limited to realizing the signal processor 212 as a hardware component. In an embodiment, the signal processor 212 may be implemented as a software module included in a computer program code (stored in the memory 216), which may be executable by the processor 208 to perform the functionalities of the signal processor 212.

The NLP 214 is a processor configured to analyze natural language content (e.g., textual content within or extracted from the multimedia content) to draw meaningful conclusions therefrom. In an embodiment, the NLP 214 may employ one or more natural language processing and one or more machine learning techniques known in the art to perform the analysis of the natural language content. Examples of such techniques include, but are not limited to, Naïve Bayes classification, artificial neural networks, Support Vector Machines (SVM), multinomial logistic regression, or Gaussian Mixture Model (GMM) with Maximum Likelihood Estimation (MLE). In an embodiment, the NLP 214 may extract one or more keywords from the first textual content (determined by the image processor 210) and the second textual content (determined by the signal processor 212) using the one or more natural language techniques. In an embodiment, the one or more keywords may be associated with one or more concepts explained in the multimedia content. Further, in an embodiment, the NLP 214 may determine a number of repetitions of the one or more concepts in the multimedia content. Though the NLP 214 is depicted as separate from the processor 208 in FIG. 2, a person skilled in the art would appreciate that the functionalities of the NLP 214 may be implemented within the processor 208 without departing from the scope of the disclosure. Further, a person skilled in the art will understand that the scope of the disclosure is not limited to realizing the NLP 214 as a hardware component. In an embodiment, the NLP 214 may be implemented as a software module included in a computer program code (stored in the memory 216), which may be executable by the processor 208 to perform the functionalities of the NLP 214.

The memory 216 stores a set of instructions and data. Some of the commonly known memory implementations include, but are not limited to, a random access memory (RAM), a read only memory (ROM), a hard disk drive (HDD), and a secure digital (SD) card. Further, the memory 216 includes the one or more instructions that are executable by the processor 208 to perform specific operations. It is apparent to a person with ordinary skills in the art that the one or more instructions stored in the memory 216 enable the hardware of the application server 102 to perform the predetermined operations. Further, in an embodiment, the memory 216 may store a metadata associated with the multimedia content, which is determined based on an analysis of the multimedia content by at least one of the processor 208, the image processor 210, the signal processor 212, and the natural language processor 214. In an embodiment, the metadata may include at least the body language information and the interaction information.

The operation of the application server 102 for indexing the multimedia content has been described further in conjunction with FIG. 3.

Figure 3A:
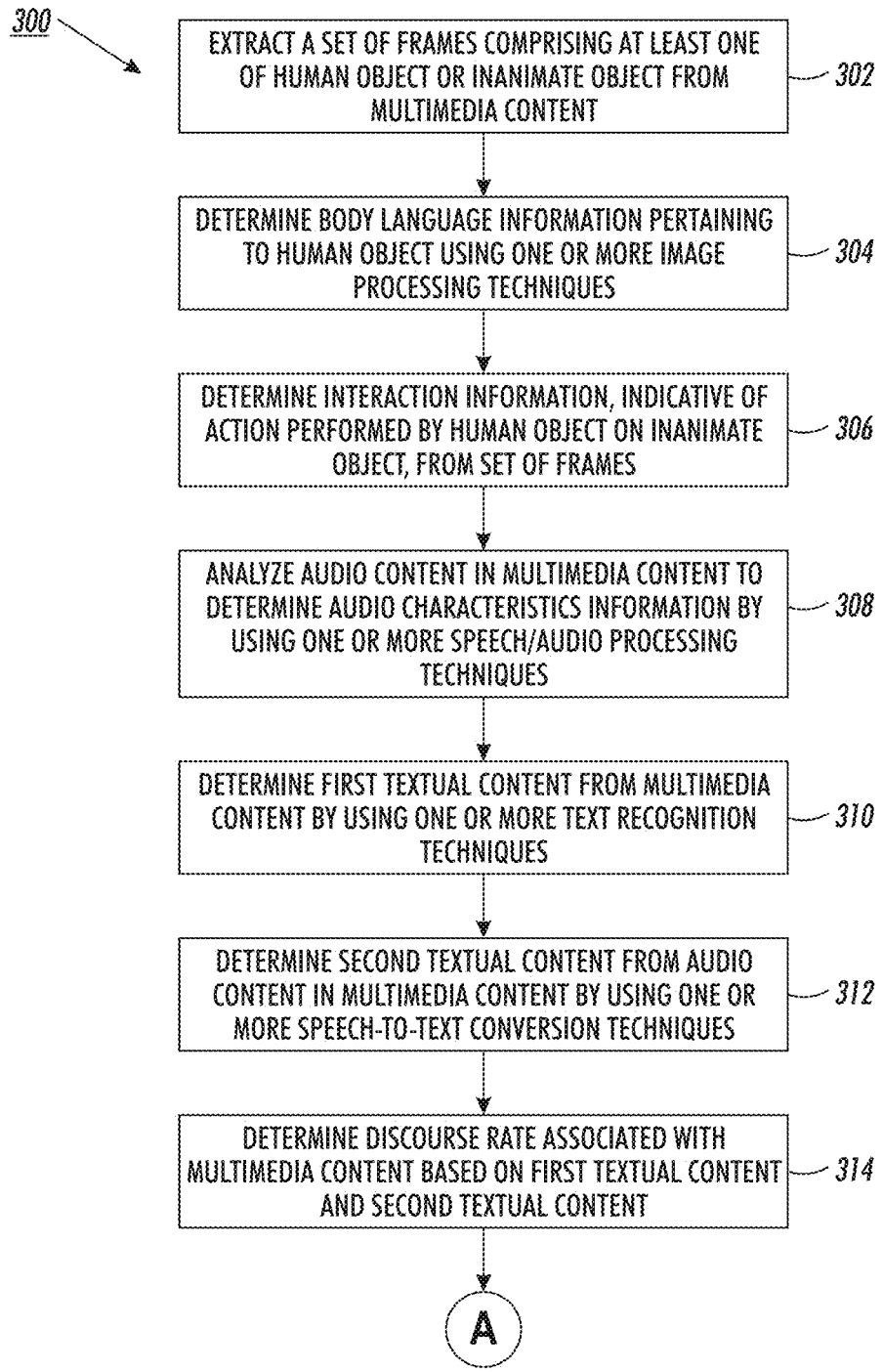
FIGS. 3A and 3B illustrate a flowchart of a method for indexing a multimedia content, in accordance with at least one embodiment.
Figure 3B:
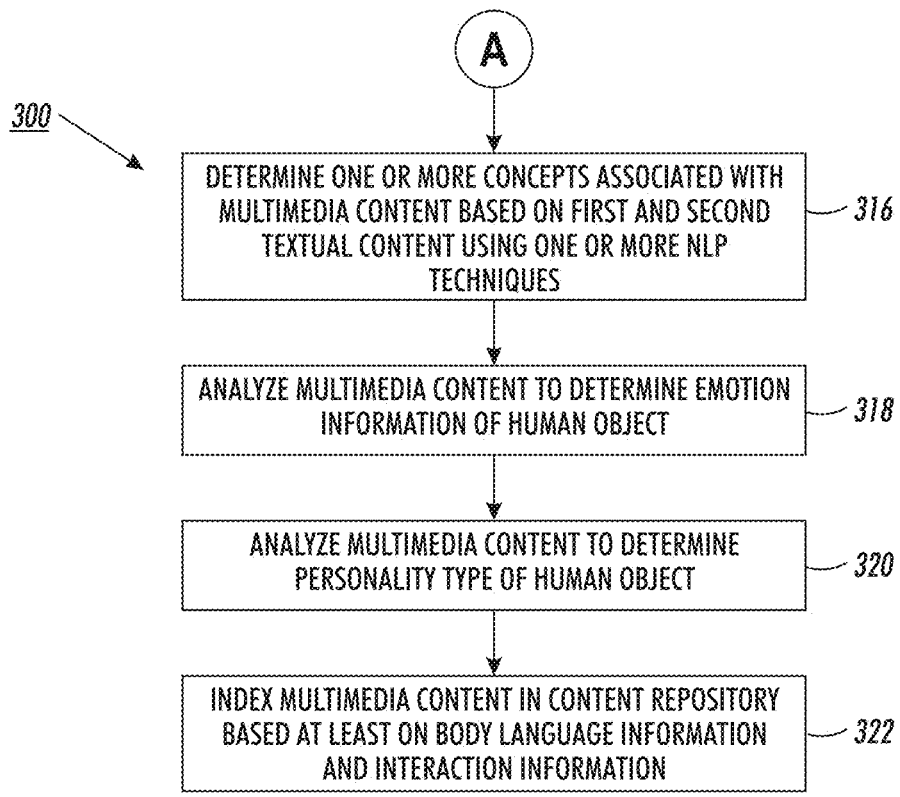

FIGS. 3A and 3B illustrate a flowchart 300 of a method for indexing the multimedia, in accordance with at least one embodiment. The flowchart 300 is described in conjunction with FIG. 1 and FIG. 2.

At step 302, the set of frames are extracted from the multimedia content. In an embodiment, the image processor 210 is configured to extract the set of frames from the multimedia content, such that the set of frames include at least one of a human object and an inanimate object. Prior to extraction of the set of frames, in an embodiment, the processor 208 may receive the multimedia content from the content repository 106. Alternatively, the processor 208 may receive the multimedia content from the user-computing device 108. In an embodiment, the multimedia content includes one or more of an educational lecture, a corporate e-learning module (ELM), or a marketing/promotional video. After receiving the multimedia content, the processor 208 may segregate the audio content and the video content in the multimedia content. Thereafter, the processor 208 may provide the audio content to the signal processor 212 and provide the video content to the image processor 210 for further processing. On receiving the video content associated with the multimedia from the processor 208, the image processor 210 may extract the set of frames from the video content by using one or more image processing techniques. For example, the image processor 210 may use one or more facial detection techniques to detect a presence of a human object in a frame. In an embodiment, the human object may correspond to an individual represented within the multimedia content. Further, a person skilled in the art will understand that the human object may also include one or more of, but not limited to, an animated character, a cartoon character, or any other fictitious animated character in the multimedia content. Further, the image processor 210 may use one or more image feature detection techniques (e.g., edge detection, ridge detection, histogram analysis, contour detection, and so on) to detect a presence of an inanimate object in a frame. In an embodiment, the inanimate object may include, but is not limited to, a presentation slide, a writing board, a poster, a paper, or a prop/model.

A person skilled in the art will understand that the scope of the disclosure should not be limited to the aforementioned techniques for extracting the set of frames from the multimedia content. Any image processing technique may be used for extracting the set of frames from the multimedia content without departing from the spirit of the disclosure.

At step 304, the body language information pertaining to the human object is determined from the set of frames. In an embodiment, the image processor 210 is configured to determine the body language information pertaining to the human object from the set of frames in the multimedia content using one or more image processing techniques. In an embodiment, the body language of the human object corresponds to a non-verbal message, feeling, thought, or intention conveyed by the human object in the multimedia content. In an embodiment, the image processor 210 may determine the body language information based on one or more of a hand motion of the human object in the multimedia content, a body motion of the human object, a facial expression/emotion of the human object, a proximity of the human object to a video capturing device utilized for creation of the multimedia content, or an eye contact of the human object towards the video capturing device.

Hand Motions of the Human Object

In an embodiment, the image processor 210 may track a motion of the human object's hands in the set of frames using one or more object tracking techniques. Thereafter, the image processor 210 may analyze the hand motion of the human object using one or more pattern detection techniques to determine the body language of the human object based on the hand motion. For example, the human object uses frequent hand gestures in the multimedia content. Thus, in such a scenario, the human object may be confident and may display openness in expressing his/her feelings and explaining the one or more concepts in the multimedia content. Further, if the human object keeps his/her hands in a relaxed state, this may be indicative of the human object being in a relaxed state of mind. Thus, it may indicate self-confidence and self-assurance. However, if the human object clenches his/her fists, this may display his/her stress or anger. Alternatively, if the human object wrings his/her hands, this may indicate nervousness or anxiety.

Body Motions of the Human Object

In an embodiment, the image processor 210 may track a motion of the human object's body in the set of frames using one or more object tracking techniques. Thereafter, the image processor 210 may analyze the body motions of the human object to determine a body posture of the human object using one or more pattern detection techniques. The body posture of the human object may be useful to determine the body language of the human object. For example, if the human object sits/stands upright and keeps his/her hands/feet apart, this may be indicative of an open body posture. In such a scenario, the body language of the human object may be associated with qualities such as friendliness, openness, and willingness. Further, if the human object hunches forward and keeps his/her hands/feet crossed, this may be indicative of a closed body posture. In such a scenario, the body language of the human object may be associated with qualities such as unfriendliness, hostility, and anxiety.

Facial Expressions/Emotions of the Human Object

In an embodiment, the image processor 210 may use one or more facial detection and/or pattern recognition techniques to determine facial expressions/emotions of the human object from the set of frames in the multimedia content. The facial expressions/emotions of the human object may be used to determine the information pertaining to the body language of the human object. For example, if the human object has a happy facial expression and smiles frequently while speaking, this may be indicative of the body language of the human object being associated with qualities such as openness and willingness. However, if the human object has an indifferent look on his/her face and does not smile much, this may be indicative of the body language of the human object being associated with qualities such as anxiety, lack of confidence, or disinterest.

Proximity of the Human Object to a Video Capturing Device

A person skilled in the art will understand that during a creation of the multimedia content, a video footage of the human object may be captured using a video capturing device (e.g., a camera/video recorder). The human object may look towards the video capturing device and may be at a certain distance from the video capturing device during the recording of the video footage. In an embodiment, the image processor 210 may determine this distance of the human object from the video capturing device using the one or more facial detection and/or pattern recognition techniques. For instance, after the recording of the video footage, the video capturing device may embed information pertaining a lens of the video capturing device within the multimedia content. The information pertaining to the lens of the video capturing device may include, but is not limited to, a focal length of the lens, an aperture of the lens, and an exposure of the lens. In an embodiment, the image processor 210 may detect the human object in the video footage within the multimedia content using the one or more facial detection and/or pattern recognition techniques. Thereafter, the image processor 210 may use the information pertaining to the lens of the video capturing device (e.g., the focal length of the lens) to determine the distance of the human object from the video capturing device.

After determining the distance of the human object from the video capturing device, the image processor 210 may determine a degree of proximity of the human object from the video capturing device. For instance, the image processor 210 may determine that the human object is proximate to the video capturing device if the human object stays within a predefined distance from the video capture device. A close proximity of the human object to the video capturing device may be indicative of the body language of the human object being open, friendly, and expressive. Further, this may also portray qualities of confidence and self-assurance in the human object's body language. On the contrary, a lesser proximity from the video capturing device may be indicative of the body language of the human object being aloof, shy, nervous, or anxious.

Eye Contact of the Human Object Towards the Video Capturing Device

Using the one or more facial detection and/or pattern recognition techniques to analyze the video footage, the image processor 210 may determine a degree of eye contact of the human object towards the video capturing device. For example, the human object looks away frequently or does not have sufficient eye contact towards the video capturing device, while facing the video capturing device. This may be indicative of the body language of the human object having qualities such as lack of confidence, evasiveness, nervousness, camera consciousness, or anxiety. However, if the human object looks directly into the video capturing device and maintains eye contact, this may indicate the human object's body language exhibiting confidence, openness, self-assurance, and sincerity.

A person skilled in the art will understand that the scope of the disclosure should not be limited to determining the body language information based on the aforementioned factors and using the aforementioned techniques (as discussed in the step 304). Further, the examples provided in supra are for illustrative purposes and should not be construed to limit the scope of the disclosure.

In an embodiment, the processor 208 may represent the body language information in terms of one or more scores or vectors matrices based on the values determined for the aforementioned factors. For instance, the processor 208 may represent the body language information as a Body Language Vector (BL)={Hand Motion, Body Motion, Facial Expression/Emotion, Proximity to video capturing device, Eye contact}. In an embodiment, each value in the vector BL may be represented as a score of the respective factor associated with the body language of the human object. For instance, the factor "Hand Motion" may be represented as a score in the vector BL, such that the score varies from 0 to 1 (or any other predefined range). For example, a score of 1 for the factor "Hand Motion" may indicate a very frequent use of hand gestures by the human object, and so on. Further, the factor "Body Motion" may be represented by a score varying from −1 to +1 (or any other predefined range). For example, a score of +1 for the factor "Body Motion" may be indicative of the human object having an open body posture, such as by standing/sitting upright. On the other hand, the score or −1 for the factor "Body Motion" may indicate that the human object has a closed body posture, such as by standing/sitting in a hunched posture with crossed arms/legs, and so on. In an embodiment, the processor 208 may store the vector BL in the memory 216 as the body language information.

Further, in an embodiment, the processor 208 may use a lookup table stored in the memory 216 to determine one or more qualities associated with the body language of the human object (e.g., openness, friendliness, and willingness) based on the vector BL. Based on the one or more qualities, the processor 208 may create another vector, Quality Vector (QL)={Quality-1, Quality-2, Quality-3 . . . , Quality-n}. Thereafter, the processor 208 may also store the vector QL along with the vector BL as the body language information in the memory 216.

A person skilled in the art will understand that the scope of the disclosure should not be limited to representing the body language information as one or more scores or vector matrices (e.g., BL and QL). The body language information may be represented in any other format without departing from the spirit of the disclosure.

At step 306, the interaction information is determined from the set of frames. In an embodiment, the image processor 210 is configured to determine the interaction information from the set of frames in the multimedia content using one or more image processing techniques. In an embodiment, the interaction information is indicative of an action performed by the human object on the inanimate object. Examples of the inanimate object may include, but are not limited to, a presentation slide, a writing board, a poster, a paper, or a prop/model. Further, examples of the action performed by the human object on the inanimate object include, but are not limited to, the human object writing on the inanimate object, the human object pointing towards or touching the inanimate object, the human object holding the inanimate object, the human object scrolling through a textual content on the inanimate object, or the human object modifying/highlighting the textual content on the inanimate object.

The Human Object Writing on the Inanimate Object

In an embodiment, the image processor 210 may analyze the set of frames to detect the inanimate object and the human object, using the one or more image processing techniques (e.g., one or more facial detection/pattern detection techniques). Thereafter, the image processor 210 may detect whether the human object writes or scribbles on the inanimate object. For instance, the image processor 210 may perform a frame subtraction between consecutive frames or a consecutive group of frames from the set of frames to determine a change in the textual content on the inanimate object. Further, the image processor 210 may determine if the human object caused the change in the textual content (e.g., by writing/scribbling) on the inanimate object. The image processor 210 may also employ one or more pattern matching techniques on the set of frames to search for objects that may be used by the human object to write/scribble on the inanimate object, for example, a pen, a highlighter, or any other writing/drawing instrument. Thus, the image processor 210 may determine whether and how frequently the human object wrote/scribbled on the inanimate object.

The Human Object Pointing Towards or Touching the Inanimate Object

In an embodiment, the image processor 210 may analyze the set of frames to detect the inanimate object and the human object, using the one or more facial detection/pattern detection techniques, as discussed in supra. Thereafter, the image processor 210 may use one or more image processing techniques (e.g., one or more contour detection techniques, one or more edge detection techniques, one or more ridge detection techniques, and so on) to determine whether the human object points towards or touches the inanimate object in a particular frame. Thereafter, the image processor 210 determines a count of frames in which the human object points towards or touches the inanimate object.

The Human Object Holding the Inanimate Object

In an embodiment, the image processor 210 may determine a count of frames in which the human object holds the inanimate object, in a manner similar to that described in supra (in reference to description of the human object pointing towards or touching the inanimate object).

The Human Object Scrolling Through a Textual Content on the Inanimate Object

In an embodiment, the image processor 210 may analyze the set of frames to detect the inanimate object and the human object, using the one or more facial detection/pattern detection techniques, as discussed in supra. Thereafter, the image processor 210 may use one or more image processing techniques to determine a group of frames from the set of frames, in which the human object makes a hand movement, points towards or touches the inanimate object, or makes any other action (e.g., using a scrolling device such as a computer mouse for scrolling the textual content) such that in succeeding frames, the textual content on the inanimate object is scrolled. Such group of frames may capture the action of the human object scrolling through the textual content on the inanimate object. In an embodiment, the image processor 210 may determine a count of the group of frames in which the human object scrolled through the textual content.

In an alternate embodiment, in a scenario where the inanimate object includes a presentation slide, the multimedia content may include information pertaining to change of slides initiated by the human object. For instance, the presentation slide may correspond to a Microsoft® Powerpoint™ Presentation (PPT) slide stored in a .PPTX format. In such a scenario, when the presentation slide is presented by the human object during a recording of the video footage of the human object by the video capturing device, slide change events (e.g., scrolling of textual contents) may be captured and stored within the .PPTX file as an XML (eXtensible Markup Language) content. This XML content stored within the .PPTX file may be including within the multimedia content in a scenario where the .PPTX file is also a part of the multimedia content. In an embodiment, the image processor 210 may use the processor 208 to analyze the XML content and thereafter determine the action of the human object scrolling of the textual content in the presentation slide based on the XML content.

The Human Object Modifying/Highlighting the Textual Content on the Inanimate Object In an embodiment, the image processor 210 may determine whether and how frequently the human object modifies/highlights the textual content on the inanimate object, in a manner similar to that described in supra (in reference to description of the human object writing on the inanimate object).

A person skilled in the art will understand that the scope of the disclosure should not be limited to determining the interaction information based on the aforementioned factors and using the aforementioned techniques (as discussed in the step 306). Further, the examples provided in supra are for illustrative purposes and should not be construed to limit the scope of the disclosure.

In an embodiment, the processor 208 may represent the interaction information in terms of one or more scores or vectors matrices based on the values determined for the aforementioned factors. For instance, the processor 208 may represent the interaction information as an Interaction Vector (INT)={Writing, Pointing towards/Touching, Holding, Scrolling through textual content, Modifying/Highlighting textual content}. In an embodiment, each value in the vector INT may be represented as a score of the respective factor associated with the interaction information. For instance, the factor "Writing" may be represented as a score in the vector INT, such that the score varies from 0 to 1 (or any other predefined range). For example, the score of 1 for the factor "Writing" may indicate that the human object writes very frequently on the inanimate object. Similarly, the score of the factor "Pointing towards/Touching" may vary from 0 to 1 (or any other predefined range) in the vector INT. The score of 1 for the factor "Pointing towards/Touching" may indicate that the human object frequently points towards or touches the inanimate object, and so on. In an embodiment, the processor 208 may store the vector INT in the memory 216 as the interaction information.

Further, in an embodiment, the processor 208 may determine an interactivity score based on the vector INT. For instance, the processor 208 may perform one or more mathematical operations on the scores of the various factors within the vector INT. Examples of the one or more mathematical operations include, but are not limited to, a mean, a median, a weighted average, a mode, or any result of any applied mathematical or statistical techniques. Thereafter, the processor 208 may store the determined interactivity score along with the vector INT in the memory 216 as the interactivity information.

A person skilled in the art will understand that the scope of the disclosure should not be limited to representing the interactivity information as one or more scores or vector matrices (e.g., INT and interactivity score). The interactivity information may be represented in any other format without departing from the spirit of the disclosure.

At step 308, the audio content of the multimedia content is analyzed to determine the audio characteristics information. In an embodiment, the signal processor 212 is configured to analyze the audio content of the multimedia content to determine the audio characteristics information, using one or more speech/audio processing techniques. In an embodiment, the audio characteristics information may comprise, but is not limited to, a speech rate, an accent, a speaking style, a background audio, and a background noise.

Speech Rate

In an embodiment, the signal processor 212 may analyze the audio content to identify a first set of segments of the audio content that include voice/speech content (such as vowels and consonants) and a second set of segments of the audio content that include non-speech content (such as pauses, breaks, and non-speech expressions). Thereafter, based on a ratio of a length of the first set of segments and the second set of segments, the signal processor 212 may determine the speech rate.

Accent

In an embodiment, the signal processor 212 may analyze the audio content and identify the first set of segments of the audio content that include the voice/speech content, as discussed in supra. Thereafter, the signal processor 212 may determine a voice/speech signature associated with the voice/speech content by using one or more speech analysis techniques. Further, the signal processor 212 may use one or more pattern matching techniques to compare the determined voice/speech signature with predefined speech signatures associated with various speaking accents, stored in the memory 216. Based on the comparison, the signal processor 212 may determine the accent associated with the voice/speech content in the multimedia content.

Speaking Style

In an embodiment, the signal processor 212 may determine the voice/speech signature associated with the voice/speech content using one or more speech analysis techniques, as discussed in supra. Further, the signal processor 212 may determine various speech characteristics associated with the voice/speech content based on an analysis of the voice/speech signature using one or more pattern matching techniques. Examples of the speech characteristics include, but are not limited to, a tone, a pitch, a fluency, a prosody, and an intonation. In an embodiment, the signal processor 212 may determine the speaking style based on the speech characteristics associated with the voice/speech content.

Background Audio and Background Noise

In an embodiment, the signal processor 212 may analyze the audio content to determine a third segment of the audio content that includes a background audio and a fourth segment of the audio content that includes a background noise. To that end, the signal processor 212 may determine an audio signature associated with the audio content. Thereafter, the signal processor 212 may use one or more pattern matching techniques to compare the audio signature associated with the audio content with predefined audio signatures of background audio and background noise, stored in the memory 216. Based on the comparison, the signal processor 212 may determine the third and the fourth segments of the audio content including the background audio and the background noise, respectively. In an embodiment, the signal processor 212 may determine a length of the third and the fourth segments and stores the length in the memory 216.

A person skilled in the art will understand that the scope of the disclosure should not be limited to determining the audio characteristics, as discussed in the step 308. Further, the examples provided in supra are for illustrative purposes and should not be construed to limit the scope of the disclosure.

In an embodiment, the processor 208 may represent the audio characteristics information as one or more scores or vector matrices. For instance, the processor 208 may represent the audio characteristics information as an audio characteristics vector (AUD)={Speech rate, Accent, Speaking style, Background audio length (if present), Background noise length (if present)}. In an embodiment, the processor 208 may store the vector AUD in the memory 216 as the audio characteristics information.

A person skilled in the art will understand that the scope of the disclosure should not be limited to representing the audio characteristics information as one or more scores or vector matrices (e.g., AUD). The audio characteristics information may be represented in any other format without departing from the spirit of the disclosure.

At step 310, the first textual content is determined from the multimedia content. In an embodiment, the image processor 210 is configured to determine the first textual content from the multimedia content using one or more text recognition techniques. Examples of the one or more text recognition techniques include, but are not limited to, an Optical Character Recognition (OCR) technique, an Intelligent Character Recognition (ICR) technique, or any other text recognition technique known in the art. In an embodiment, the first textual content may include, but is not limited to, a textual content located on the inanimate object, and a close-captioned text within the multimedia content.

Textual Content Located on the Inanimate Object

For instance, the inanimate object such as a paper or a poster may have a textual content on it within the set of frames in the multimedia content. To determine this textual content, the image processor 210 may identify the inanimate object in the set of frames using one or more image processing techniques (e.g., one or more pattern detection techniques). Thereafter, the image processor 210 may determine the textual content located on the inanimate object identified in frames from the set of frames using the one or more text recognition techniques.

Close-Captioned Text within the Multimedia Content

In an embodiment, various frames of the multimedia content may include close-captioned text. In an embodiment, the close-captioned text in the multimedia content may be located within a predefined region of a frame of the multimedia content. In an embodiment, the image processor 210 may locate the predefined region in each frame using one or more image processing techniques. Thereafter, the image processor 210 may analyze the predefined region in each frame of the multimedia content using the one or more text processing techniques. A person skilled in the art will understand that the scope of the disclosure is not limited to first locating the predefined region in each frame and thereafter identifying the closed-captioned text from the predefined region in the frame. In an embodiment, the entire frame may be predefined region may not be located in each frame. Instead, the each frame may be analyzed in its entirety using the one or more text recognition techniques to determine the closed-captioned text in the multimedia content.

Further, in an embodiment, the image processor 210 may correlate the first textual content with the various frames of the multimedia content, based on the frames that included a certain textual content. Thus, the image processor 210 may identify a first set of frames in the multimedia content that included the first textual content. Further, the image processor 210 may identify a textual content (from the first textual content) associated with each frame in the first set of frames.

Further, in an embodiment, the image processor 210 may store the first textual content in the memory 216.

A person skilled in the art will understand that the scope of the disclosure should not be limited to determining the first textual content, as discussed in supra. Further, the aforementioned examples are for illustrative purposes and should not be construed to limit the scope of the disclosure.

At step 312, the second textual content is determined from the audio content in the multimedia content. In an embodiment, the signal processor 212 is configured to determine the second textual content from the audio content in the multimedia content using one or more speech-to-text conversion techniques. Examples of the one or more speech-to-text conversion techniques include, but are not limited to, Hidden Markov Models (HMM), Dynamic Time-Warping based speech recognition, neural networks, Support Vector Machines (SVM), or any other speech recognition/machine learning technique known in the art. In an embodiment, the second textual content may correspond to a textual transcription of a speech/voice or music/audio in the multimedia content. For instance, the second textual content may include the textual transcription of the speech/voice of the human object in the multimedia content. Further, if the audio content of the multimedia content includes a background music/audio, the second textual content may also include a textual transcription (e.g., lyrics) of the background music/audio.

Further, in an embodiment, the signal processor 212 may correlate the second textual content with the audio content. Thereafter, the image processor 210 and the signal processor 212 may correlate the audio content in the multimedia content with the various frames in the multimedia content using one or more image processing techniques and one or more audio processing techniques. Based on the correlation of the second textual content with the audio content, and the correlation of the audio content with the various frames, the signal processor 212 may correlate the second textual content with the various frames in the multimedia content. Thus, the signal processor 212 may identify a second set of frames in the multimedia content that correlated with an audio that transcribed to the second textual content. Further, the signal processor 212 may identify a textual content (from the second textual content) associated with each frame in the second set of frames.

Further, in an embodiment, the signal processor 212 may store the second textual content in the memory 216.

A person skilled in the art will understand that the scope of the disclosure should not be limited to determining the second textual content, as discussed in supra. Further, the aforementioned examples are for illustrative purposes and should not be construed to limit the scope of the disclosure.

At step 314, the discourse rate associated with the multimedia content is determined. In an embodiment, the NLP 214 is configured to determine the discourse rate based on the first textual content and the second textual content. In an embodiment, the NLP 214 may receive the first textual content from the image processor 210 (as determined at the step 310) and the second textual content from the signal processor 212 (as determined at the step 312). As discussed in supra, the image processor 210 may identify the first set of frames in the multimedia content that included the first textual content. Further, the image processor 210 may identify a textual content (from the first textual content) associated with each frame in the first set of frames. Further, as discussed in supra, the signal processor 212 may identify the second set of frames in the multimedia content that are correlated with the audio that is transcribed to the second textual content. Further, the signal processor 212 may identify a textual content (from the second textual content) associated with each frame in the second set of frames. In an embodiment, to determine the discourse rate associated with the multimedia content, the NLP 214 may first determine a discourse rate associated with frames that are included in both the first set of frames and the second set of frames. To that end, the NLP 214 may first identify a third set of frames as common frames that are common to both the first set of frames and the second set of frames. Thereafter, the NLP 214 may extract a first set of words/phrases/sentences from the textual content (from the first textual content) associated with each frame in the third set of frames, using one or more text processing techniques. Similarly, the NLP 214 may extract a second set of words/phrases/sentences from the textual content (from the second textual content) associated with each frame in the third set of frames. Thereafter, the NLP 214 may determine the discourse rate associated with each frame in the third set of frames as a ratio of a number of words/phrases/sentences in the second set of words/phrases/sentences associated with the frame to a number of words/phrases/sentences in the first set of words/phrases/sentences associated with that frame. Further, the NLP 214 may determine the discourse rate associated with the multimedia content as an average of the discourse rates determined for each frame in the third set of frames. In an embodiment, the NLP 214 may determine the average using one or more mathematical operations such as, but not limited to, a mean, a median, a weighted average, a mode, or any result of any applied mathematical or statistical techniques.

In an alternate embodiment, the NLP 214 may not identify the third set of frames. Further, the NLP 214 may directly extract the first set of words/phrases/sentences and the second set of words/phrases/sentences from the first textual content and the second textual content, respectively, using the one or more text processing techniques. Thereafter, the NLP 214 may determine the discourse rate associated with the multimedia content as a ratio of a number of words in the second set of words/phrases/sentences to that in the first set of words/phrases/sentences.

Further, in an embodiment, the NLP 214 may store the discourse rate associated with the multimedia content in the memory 216.

A person skilled in the art will understand that the discourse rate may be indicative of a percentage of textual content within the multimedia content (i.e., the first textual content), which is explained by the human object in his/her speech in the multimedia content (through the second textual content). In other words, the discourse rate may be indicative of a coverage of the first textual content within the second textual content. For example, the first set of frames includes 20 frames and the second set of frames includes 17 frames. There are 15 frames common to both the first set of frames and the second set of frames. Such 15 frames may be included in the third set of frames. The first set of frames may include an inanimate object such as a presentation slide with 3 lines of text containing a total of 50 words. Further, the second set of frames correspond to those frames, which include a human object. The third set of frames may correspond to frames in which the human object speaks about the textual content within the presentation slide. If the human object speaks 150 words to explain the text in the presentation slide, the discourse rate determined as 150/50, i.e., 3.

A person skilled in the art will understand that the scope of the disclosure should not be limited to determining the discourse rate, as discussed in supra. Further, the aforementioned examples are for illustrative purposes and should not be construed to limit the scope of the disclosure.

At step 316, the one or more concepts associated with multimedia content are determined. In an embodiment, the NLP 214 is configured to determine the one or more concepts based on the first textual content and the second textual content. In an embodiment, to determine the one or more concepts, the NLP 214 may extract one or more keywords from the first textual content and the second textual content using one or more text processing techniques. Thereafter, in an embodiment, the NLP 214 may determine the one or more concepts from the one or more keywords using one or more natural language processing techniques. Further, the NLP 214 may determine a number of repetitions of the one or more concepts based on the one or more keywords. For instance, if keywords related to a concept occur thirty times in the first textual content and the second textual content, the NLP 214 may determine the number of repetitions of the concept as thirty. Further, in an embodiment, the NLP 214 may store the one or more concepts and the number of repetitions of each of the one or more concepts in the memory 216.

A person skilled in the art will understand that the scope of the disclosure should not be limited to determining the one or more concepts, as discussed in supra. Various other techniques may be used to determine the one or more concepts without departing from the spirit of the disclosure.

At step 318, the emotion information pertaining to the human object is determined. In an embodiment, the processor 208 may determine the emotion information by analyzing the multimedia content using at least one of the image processor 210, the signal processor 212, and the NLP 214. In an embodiment, the emotion information may include, but is not limited to, an emotion of the human object determined from his/her facial expressions, an emotion of the human object determined from his/her speech, and an emotion/sentiment of the human object determined from the first and the second textual contents.

Determination of Emotions in Facial Expressions

To determine the emotions in the facial expressions of the human object, in an embodiment, the image processor 210 may analyze the set of frames (i.e., the frames that include the human object) using one or more facial detection techniques to identify frames from the set of frames that include a facial region of the human object. Thereafter, the image processor 210 may analyze the identified frames using one or more pattern detection techniques to determine an emotion expressed by the human object in the identified frames. Thus, the emotion of the human object may be determined based on the facial expressions of the human object in the multimedia content.

Determination of Emotions in Speech

Further, in an embodiment, the signal processor 212 may analyze the audio content in the multimedia content to identify the first set of segments of the audio content that include the voice/speech content, as discussed in supra. Thereafter, the signal processor 212 may determine the voice/speech signature associated with the voice/speech content by using the one or more speech analysis techniques. Further, the signal processor 212 may determine various speech characteristics associated with the voice/speech content based on an analysis of the voice/speech signature using one or more pattern matching techniques. Examples of the speech characteristics include, but are not limited to, a tone, a pitch, a fluency, a prosody, and an intonation. Thereafter, the signal processor 212 may compare the determined speech characteristics with predefined speech characteristics associated with one or more emotions, stored in the memory 216. Based on the comparison, the signal processor 212 may determine an emotion expressed in the speech of the human object. For example, if the speech of the human object is determined as a low pitched and subdued, the signal processor 212 may determine that the human object is expressing an unhappy emotion in his/her speech.

Determination of Emotions/Sentiments in Textual Content

Further, in an embodiment, the NLP 214 may analyze the first textual content and the second textual content using one or more natural language processing techniques (e.g., one or more sentiment analysis techniques). Based on the analysis, the NLP 214 may determine a sentiment expressed by the human object through the first and the second textual contents.

In an embodiment, the processor 208 may represent the emotion information as one or more scores or vector matrices based on the values determined for the aforementioned factors. For instance, the processor 208 may represent the emotion information as an Emotion Vector (EMO)={Emotions in facial expressions, Emotions in speech, Emotions/sentiments in textual content}. In an embodiment, each value in the vector EMO may be represented as a character string associated with a respective factor. For instance, the factor "Emotions in facial expressions" may have a value "Smiling". Further, the factor "Emotions in speech" may have a value "Excited", while the factor "Emotions/sentiments in textual content" may have a value "Happy". In an embodiment, the processor 208 may store the vector EMO in the memory 216 as the emotion information.

Further, in an embodiment, the processor 208 may use the NLP 214 to determine an emotion score based on the vector EMO. In an embodiment, the NLP 214 to analyze the character strings in the vector EMO using one or more natural language processing techniques (e.g., one or more sentiment analysis techniques) to determine a polarity associated with each character string. Further, the NLP 214 may determine a degree of the polarity (varying from +1 to −1 (or any other predefined range), depending on the polarity) associated with each character string using one or more predefined lookup tables, stored in the memory 216. Thereafter, the processor 208 may determine the emotion score as an average of the degree of polarities determined for each character string. In an embodiment, the processor 208 may determine the average using one or more mathematical operations such as, but not limited to, a mean, a median, a weighted average, a mode, or any result of any applied mathematical or statistical techniques. Thereafter, the processor 208 may also store the emotion score along with the vector EMO as the emotion information in the memory 216.

For example, the vector EMO={"Smiling", "Excited", "Happy"}. The NLP 214 may determine that all three character strings in the vector EMO are associated with positive emotions, and hence, may have a positive polarity. Further, the NLP 214 may determine the degree of polarity of the three character strings as +0.6, +0.8, and +0.7. Thereafter, the processor 208 may determine the emotion score as +0.7 (i.e., the average of +0.6, +0.8, and +0.7).

A person skilled in the art will understand that the scope of the disclosure should not be limited to representing the emotion information as one or more scores or vector matrices (e.g., EMO and the emotion score). The emotion information may be represented in any other format without departing from the spirit of the disclosure.

At step 320, the personality type of the human object is determined. In an embodiment, the processor 208 is configured to determine the personality type of the human object based on various factors such as, but not limited to, the body language information, the interaction information, the emotion information, the speech rate of the human object, the speaking style of the human object, and the second textual content determined from the audio content within said multimedia content. Details pertaining to the determination of the body language information, the interaction information, the emotion information, the speech rate, the speaking style, and the second textual content have been discussed in supra. In an embodiment, the processor 208 may use at least one of the image processor 210, the signal processor 212, and the NLP 214 to analyze the aforementioned factors (e.g., the body language information, the interaction information, the emotion information, the speech rate of the human object, the speaking style of the human object, and the second textual content). Based on the analysis, the processor 208 may determine one or more personality traits associated with human object. In an embodiment, the processor 208 may use a predefined personality type model, such as, a Myers-Briggs Personality Type Model, to represent the personality type of the human object based on the determined personality traits. For instance, the processor 208 may compare the one or more determined personality traits with predefined personality traits associated with known personality types, stored in the memory 216. Based on the comparison, the processor 208 may determine the personality type of the human object. For instance, if the one or more personality traits of the human object are Extroversion (E), Sensing (S), Feeling (F), and Judging (J), the processor 208 may determine the personality type of the human object as ENFJ. Thereafter, the processor 208 may store the personality type of the human object in the memory 216.

Personality Trait Determination Based on Body Language Information

For example, based on the body language information, the processor 208 determines that the human object has an open body posture (e.g., the human object stands/sits in an upright posture). Thus, in such a scenario, the processor 208 may determine that the human object may have a personality trait of "Extroversion".

Personality Trait Determination Based on Interaction Information

For example, the interaction information may indicate that the human object interacts frequently with the inanimate object. In such a scenario, the human object may be confident in explaining the concepts mentioned in the multimedia content. Again, the processor 208 may determine that the human object may have a personality trait of "Extroversion".

Personality Trait Determination Based on Emotion Information

Further, for instance, if based on the emotion information the processor 208 determines that the human object expresses a happy and warm emotion; the processor 208 may determine that the human object has a personality trait of "Sensing".

Personality Trait Determination Based on Speaking Rate and Speaking Style

Further, for instance, the human object has a fast speaking rate and the speaking style of the human object indicates that he/she has a high pitch and does not pause much. In such a scenario, the processor 208 may again determine that the human object may have a personality trait of "Extroversion".

Personality Trait Determination Based on Second Textual Content

In an embodiment, the NLP 214 may analyze the second textual content using one or more sentiment analysis techniques to determine a sentiment expressed by the human object. For instance, the NLP 214 determines that the human object expresses a sentiment of concern towards others in the second textual content. Hence, the NLP 214 may determine that the human object has a personality trait of "Feeling". However, if based on the analysis of the second textual content, the NLP 214 determines that the human object expresses a sentiment of judgment or fact associated with another object, the NLP 214 may determine that the human object may possess a personality trait of "Judging".

A person skilled in the art will understand that the scope of the disclosure should not be limited to determining the personality type, as discussed in supra. Further, the aforementioned examples are for illustrative purposes and should not be construed to limit the scope of the disclosure.

A person skilled in the art will understand that the steps 304 through 312 may be performed in any order without departing from the scope of the disclosure. Further, in an embodiment, the steps 304 through 312 may be performed in parallel without departing from the spirit of the disclosure.

Further, a person skilled in the art will understand that the steps 314 and 316 may be performed in any order after the steps 310 and 312 without departing from the scope of the disclosure. Further, in an embodiment, the steps 314 and 316 may be performed in parallel without departing from the spirit of the disclosure. Further, the steps 318 and 320 may be performed in any order or in parallel after the steps 302 through 316 without departing from the scope of the disclosure.

At step 322, the multimedia content is indexed in the content repository 106. In an embodiment, the processor 208 is configured to index the multimedia content in the content repository 106 based at least on the body language information and the interaction information. Further, in addition to indexing the multimedia content based on the body language information and the interaction information, the processor 208 may further index the multimedia content in the content repository 106 based on the emotion information, the audio characteristics information, the discourse rate, the one or more concepts in the multimedia content, the number of repetitions of the one or more concepts, the personality type of the human object, or any combination thereof. To index the multimedia content, in an embodiment, the processor 208 may generate a metadata associated with the multimedia content. In an embodiment, the metadata may at least include the body language information and the interaction information. In addition, the metadata may also include one or more of the emotion information, the audio characteristics information, the discourse rate, the one or more concepts in the multimedia content, the number of repetitions of the one or more concepts, the personality type of the human object. After generating the metadata associated with the multimedia content, the processor 208 may transmit the metadata to the content repository 106. The content repository 106 may index the multimedia content based on the received metadata.

For instance, the content repository 106 includes 3000 multimedia contents indexed based on their respective metadata. The following table illustrates an example of the metadata associated with two such multimedia contents:

TABLE 1

Examples metadata associated with two multimedia contents

| | Multimedia-1 | Multimedia-2 |
|---|---|---|
| Body Language Information | Frequent hand movement, open body posture, smiling facial expressions, 1 feet distance from video capturing device, high level of eye contact | Less hand movement, closed body posture, indifferent facial expressions, 3 feet distance from video capturing device, medium level of eye contact |
| Interaction Information | High interactivity (Writing, Pointing towards, and Highlighting text on presentation slides) | Medium interactivity (Pointing towards presentation slides) |
| Emotion Information | Emotions Facial expressions = "Smiling" Emotions in speech = "Excited" Emotions in textual content = "Happy" | Emotions Facial expressions = "Indifferent" Emotions in speech = "Indifferent" Emotions in textual content = "Indifferent" |
| Audio Characteristics Information | Speech rate = 1.8 terms/sec, Accent = "US English", Speaking style = "High pitch, fluent, varying tone" Background music = "Yes" (Beatles_Title_Track.wav) Background noise = 25 dB | Speech rate = 1.4 terms/sec, Accent = "UK English", Speaking style = "Low pitch, fluent, mono-tone" Background music = "No" Background noise = 15 dB |
| Discourse Rate | 0.945 | 0.136 |
| Concepts/No. of repetitions of concepts | Newton's law of motion (25 times), Inertia (10 times), Mass (8 times), Acceleration (7), Impulse (5 times), . . . | Organic chemistry (55 times), Hydrocarbons (38 times), Benzene ring (25 times), Bond energy (20 times), . . . |
| Personality Type of Human Object | "ENFJ" (Extroversion, Intuitive, Feeling, Judging) | "ISFJ" (Introversion, Sensing, Feeling, Judging) |

The above table illustrates the metadata associated with a multimedia-1 and a multimedia-2. As shown above, the metadata associated with the multimedia-1 and the multimedia-2 may include various factors associated with the respective multimedia content such as, but not limited to, the body language information, the interaction information, the emotion information, the audio characteristics information, the discourse rate, the concepts/no. of repetitions of concepts, and the personality type of the human object. As explained above, the multimedia-1 and the multimedia-2 may be indexed in the content repository 106 based at least on the factors such as the body language information and the interaction information. Further, in addition to the body language information and the interaction information, the multimedia-1 and the multimedia-2 may be indexed in the content repository 106 based on any combination of one or more of the other factors mentioned above.

A person skilled in the art will understand that the example of the metadata associated with the two multimedia contents (the multimedia-1 and the multimedia-2) have been provided for illustrative purposes and should not be construed to limit the scope of the disclosure.

Figure 4:
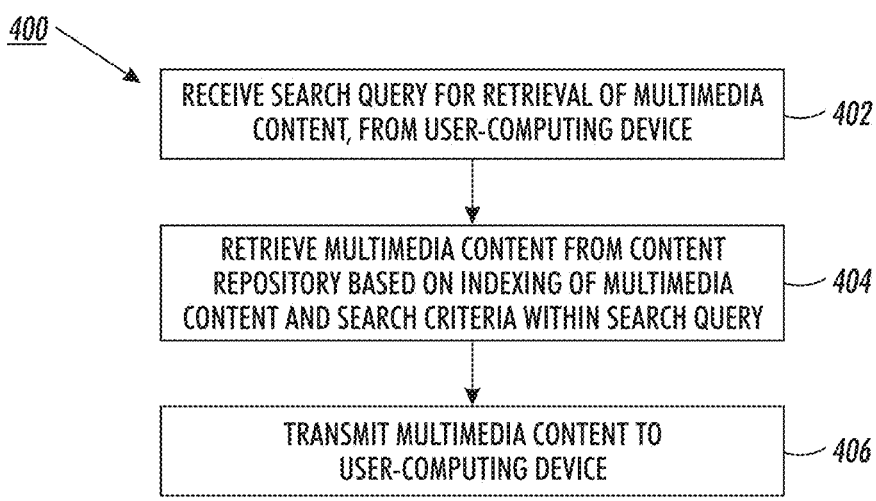
FIG. 4 illustrates a flowchart of a method for retrieving a multimedia content from a content repository, in accordance with at least one embodiment.

FIG. 4 is a flowchart 400 illustrating a method for retrieving a multimedia content from the content repository 106, in accordance with at least one embodiment. The flowchart 400 is described in conjunction with FIG. 1 and FIG. 2.

At step 402, a search query for retrieval of a multimedia content is received from the user-computing device 108. In an embodiment, the processor 208 is configured to receive the search query from the user-computing device 108 through the transceiver 202. In an embodiment, the user of the user-computing device 108 may generate the search query using the user-interface of the user-computing device 108. In an embodiment, the search query may include a search criteria related to the multimedia content. In an embodiment, the user-interface of the user-computing device 108 may include one or more fields to accept inputs from the user (e.g., text boxes, drop down lists, radio buttons). Based on the inputs provided by the user in the one or more fields, the user-computing device 108 may generate the search criteria.

At step 404, the multimedia content is retrieved from the content repository 106. In an embodiment, the processor 208 may retrieve the multimedia content from the content repository 106 based on the search criteria in the query. As discussed in supra (refer to the step 322), the multimedia content may be indexed in the content repository 106 based on the metadata associated with the multimedia content (as determined by the processor 208). As discussed above, the metadata may include at least the body language information and the interaction information. In addition, in an embodiment, the metadata may also include one or more of the emotion information, the audio characteristics information, the discourse rate, the one or more concepts in the multimedia content, the number of repetitions of the one or more concepts, the personality type of the human object. In an embodiment, the processor 208 may use the search engine 104 to retrieve the multimedia content from the content repository 106 based on the search criteria and the indexing of the multimedia content in the content repository 106. For instance, the search criteria is "{Body Language=Open and Expressive, Interaction=Medium interaction level, Accent=US English}." In such a scenario, the search engine 104 may retrieve such a multimedia content from the content repository 106 in which a human object is open and expressive, has a medium level of interactivity with an inanimate object, and speaks in a US English accent.

At step 406, the retrieved multimedia content is transmitted to the user-computing device 108. In an embodiment, the processor 208 is configured to transmit the multimedia content, which is retrieved from the content repository 106, to the user-computing device 108 through the transceiver 202. Thereafter, in an embodiment, the user-computing device 108 may present the multimedia content to the user through the user-interface of the user-computing device 108. For instance, the user-computing device 108 may play the multimedia content on a media player software installed on the user-computing device 108. The user-computing device 108 may display an image/video in the multimedia content on a display device associated with the user-computing device 108. Further, the user-computing device 108 may play an audio in the multimedia content on an audio device associated with the user-computing device 108. Example user-interfaces presented on the user-computing device 108 for displaying the multimedia content to the user have been explained in conjunction with FIGS. 5A-5E.

FIGS. 5A, 5B, 5C, 5D, and 5E illustrate example user-interfaces (UIs) 500A, 500B, 500C, 500D, and 500E, respectively, presented on the user-computing device 108 to display a multimedia content 502, in accordance with at least one embodiment.

As shown in FIGS. 5A, 5B, 5C, 5D, and 5E, each of the UIs 500A, 500B, 500C, 500D, and 500E, respectively, may include a first region 504, a play button 506, a volume button 508, a seek slider 510, and a seek bar 512. In an embodiment, the first region 504 displays an image/video (e.g., one or more frames) associated with the multimedia content 502. The user may use the play button 506 for playing, pausing, or stopping the multimedia content being presented through the first region 504. Further, the user may use the volume button 508 to adjust or mute/unmute a volume of an audio associated with the multimedia content 502, which may be played through the audio device of the user-computing device 108. In addition, the user may adjust the seek slider 510 on the seek bar 512 to navigate to a particular frame in the multimedia content 502.

Figure 5A:
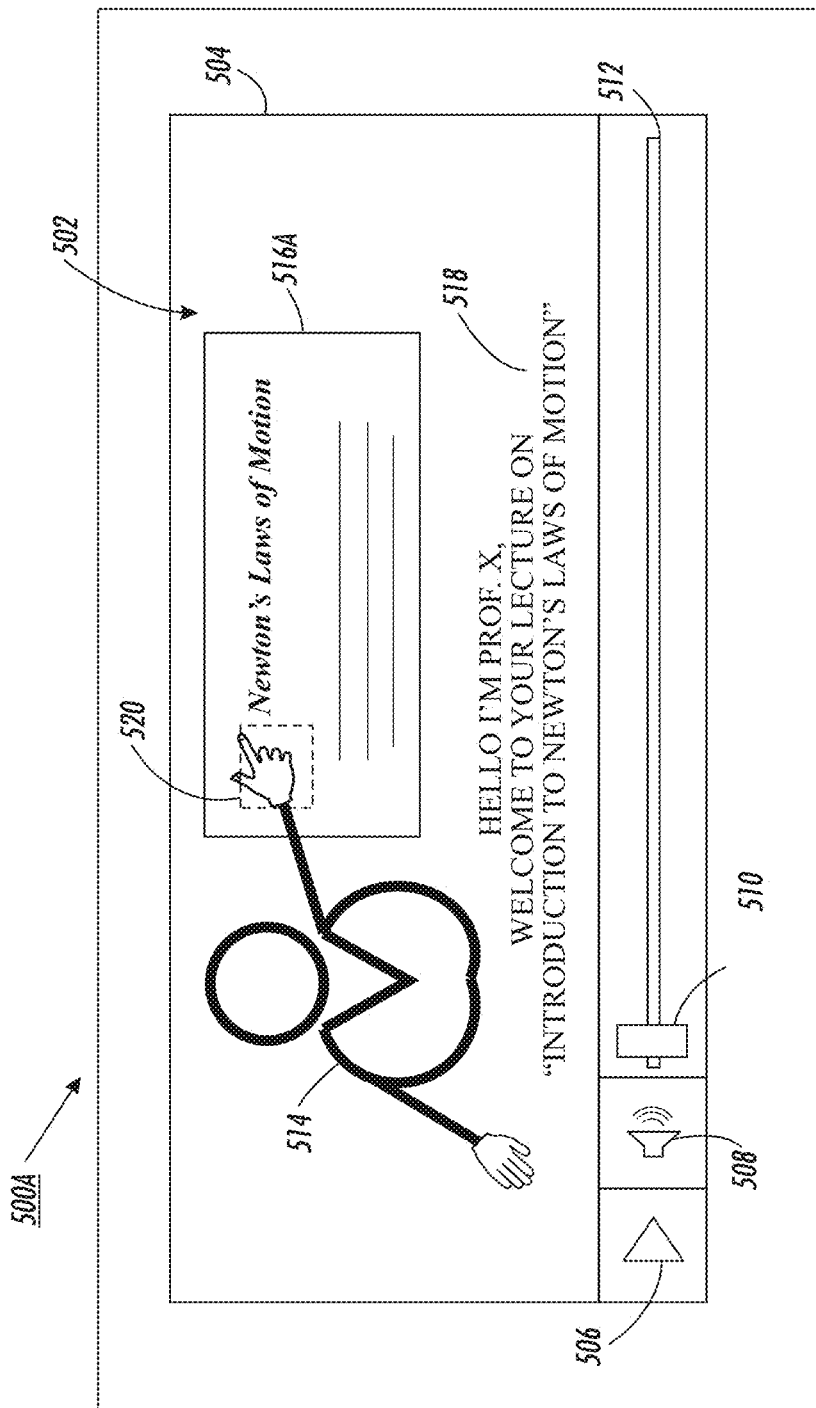
FIGS. 5A, 5B, 5C, 5D, and 5E illustrate example user-interfaces presented on a user's computing device to display a multimedia content, in accordance with at least one embodiment.

As shown in FIG. 5A, the UI 500A depicts a frame of the multimedia content 502 that includes a human object 514 (e.g., a teacher), a first inanimate object 516A (e.g., a presentation slide), and a closed-captioned text 518 (i.e., "Hello I'm Prof. X, Welcome to your lecture on "Introduction to Newton's Laws of Motion""). Further, as shown FIG. 5A, the human object 514 points towards (depicted by 520) the first inanimate object 516A. For example, the human object 514 points towards a text "Newton's Laws of Motion", which is written on the first inanimate object 516A (e.g., the presentation slide). Thus, in the current scenario, the interaction information associated with the multimedia content 502 may be indicative of the human object 514 interacting with the first inanimate object 516A by pointing towards/touching (depicted by 520) the first inanimate object 516A.

Figure 5B:
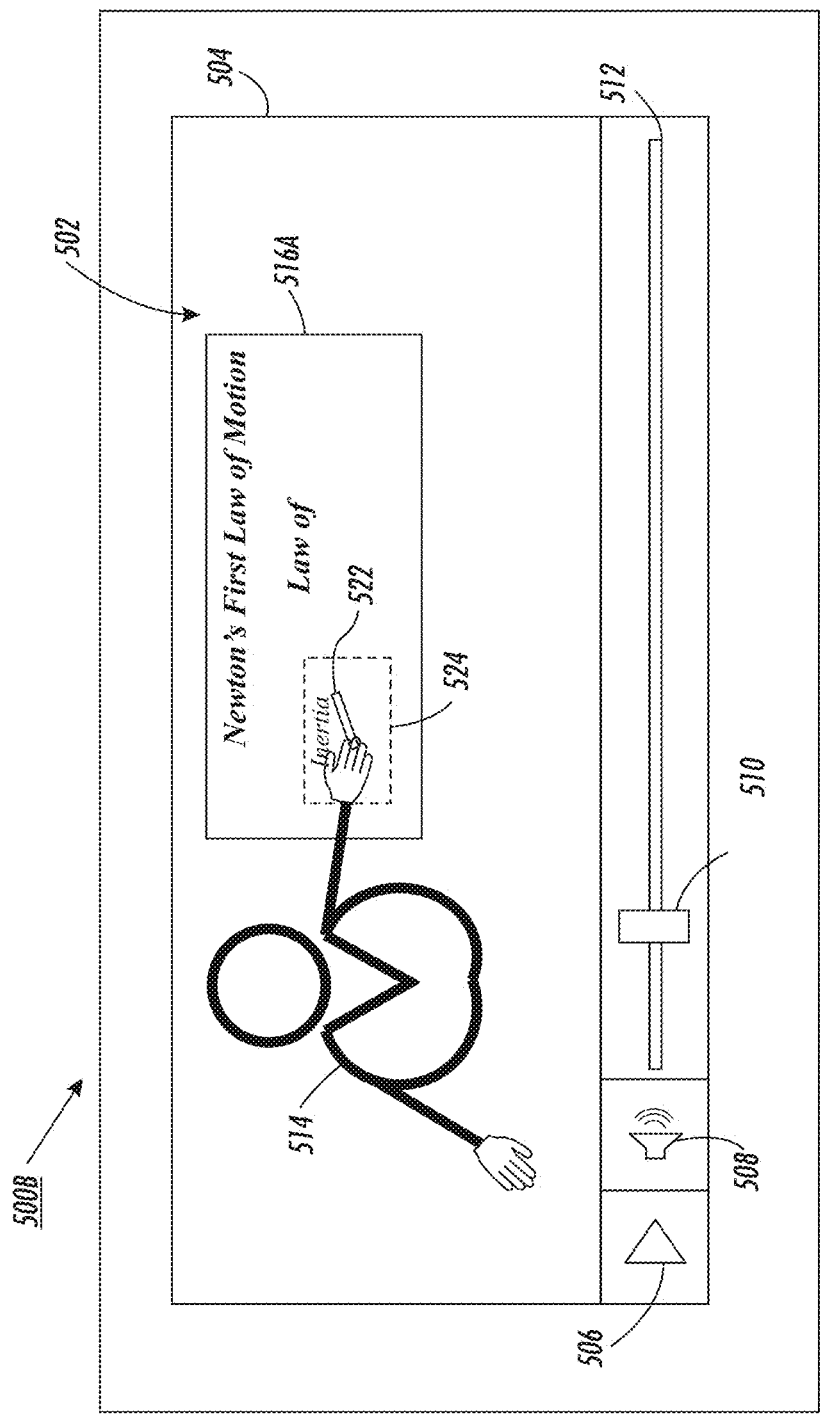

As shown in FIG. 5B, the UI 500B depicts a frame of the multimedia content 502 that includes the human object 514 (e.g., the teacher), the first inanimate object 516A (e.g., the presentation slide), and a writing instrument 522 (e.g., a pen). Further, as shown FIG. 5B, the human object 514 writes on (depicted by 524) the first inanimate object 516A using the writing instrument 522. For example, the human object 514 writes a word "Inertia" on the first inanimate object 516A (e.g., the presentation slide) using the writing instrument 522 (e.g., the pen). Thus, in the current scenario, the interaction information associated with the multimedia content 502 may be indicative of the human object 514 interacting with the first inanimate object 516A by writing on (depicted by 524) the first inanimate object 516A.

Figure 5C:
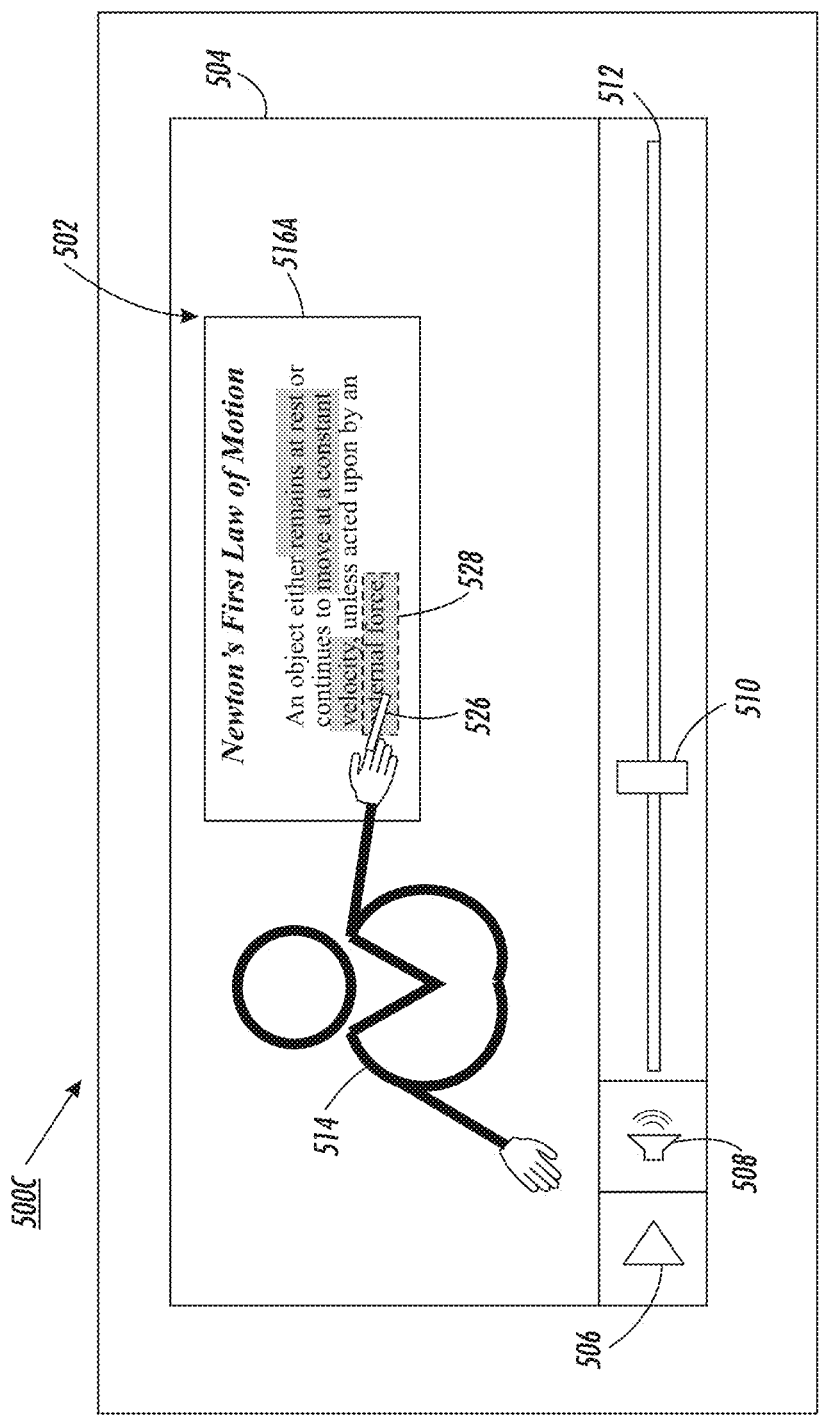

As shown in FIG. 5C, the UI 500C depicts a frame of the multimedia content 502 that includes the human object 514 (e.g., the teacher), the first inanimate object 516A (e.g., the presentation slide), and a highlighting instrument 526 (e.g., a highlighter pen). Further, as shown FIG. 5B, the human object 514 highlights (depicted by 528) text written on the first inanimate object 516A using the highlighting instrument 526. For example, the human object 514 highlights phrases such as "remains at rest", "move at constant velocity", and "external force" on the first inanimate object 516A (e.g., the presentation slide) using the highlighting instrument 526 (e.g., the highlighter pen). Thus, in the current scenario, the interaction information associated with the multimedia content 502 may be indicative of the human object 514 interacting with the first inanimate object 516A by highlighting (depicted by 528) the text on the first inanimate object 516A.

Figure 5D:
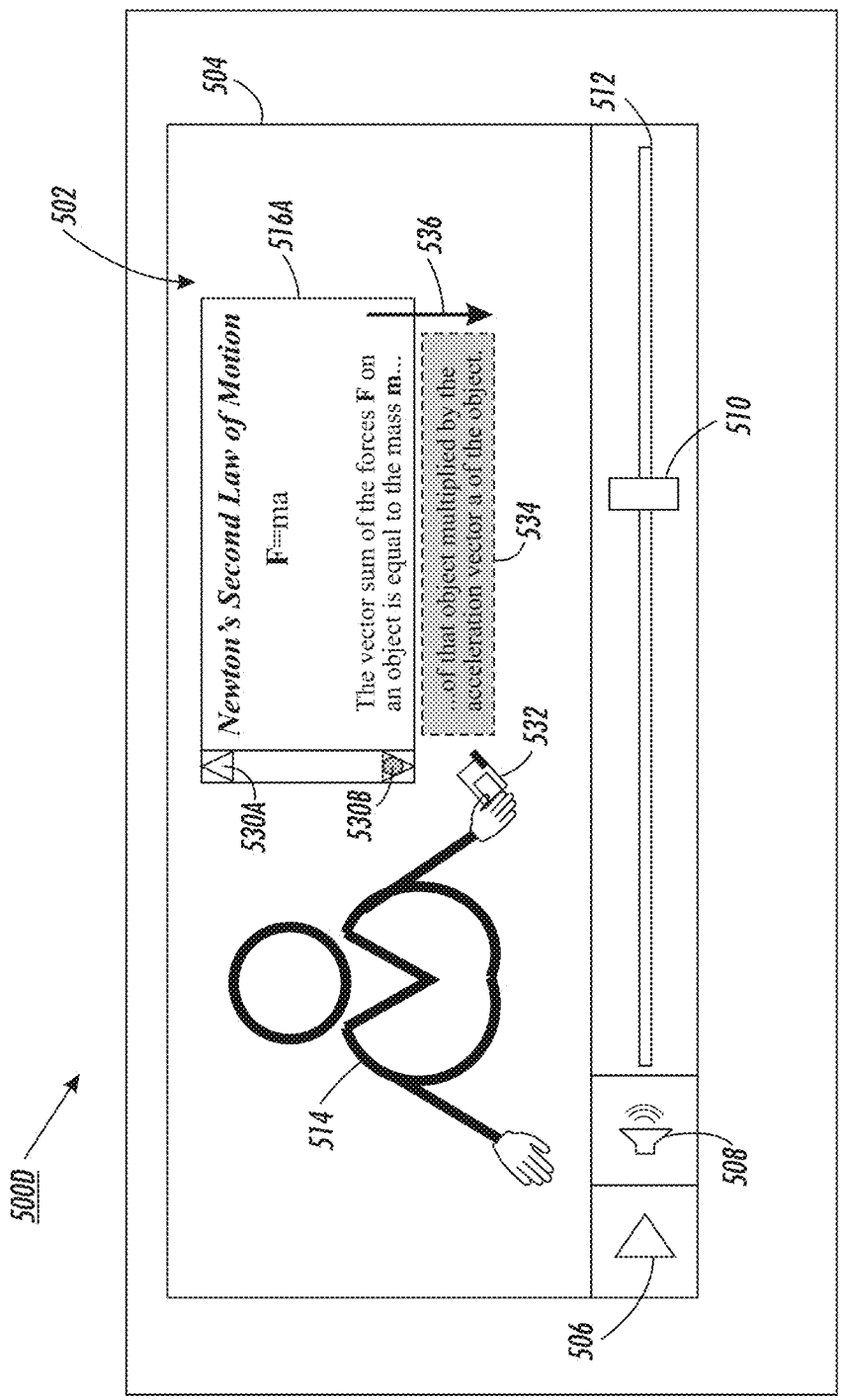

As shown in FIG. 5D, the UI 500D depicts a frame of the multimedia content 502 that includes the human object 514

(e.g., the teacher), the first inanimate object 516A (e.g., the presentation slide), and a scrolling instrument 532 (e.g., a computer mouse, a track-pad, or a presentation remote). Further, as shown FIG. 5B, the human object 514 may scroll (depicted by 536) text written on the first inanimate object 516A using the scrolling instrument 532. For example, the human object 514 may uses the scrolling instrument 532 (e.g., the computer mouse, the track-pad, or the presentation remote) to activate an up-scroll button 530A or a down-scroll button 530B. If the human object 514 activates the down-scroll button 530B (as depicted in FIG. 5D), the text written on the first inanimate object 516A (e.g., the presentation slide) may be scrolled in the downward direction (depicted by 536). Consequently, a previously hidden text 534 (i.e., "of that object multiplied by the acceleration vector a of the object") may become visible. Thus, in the current scenario, the interaction information associated with the multimedia content 502 may be indicative of the human object 514 interacting with the first inanimate object 516A by scrolling (depicted by 536) the text on the first inanimate object 516A.

Figure 5E:
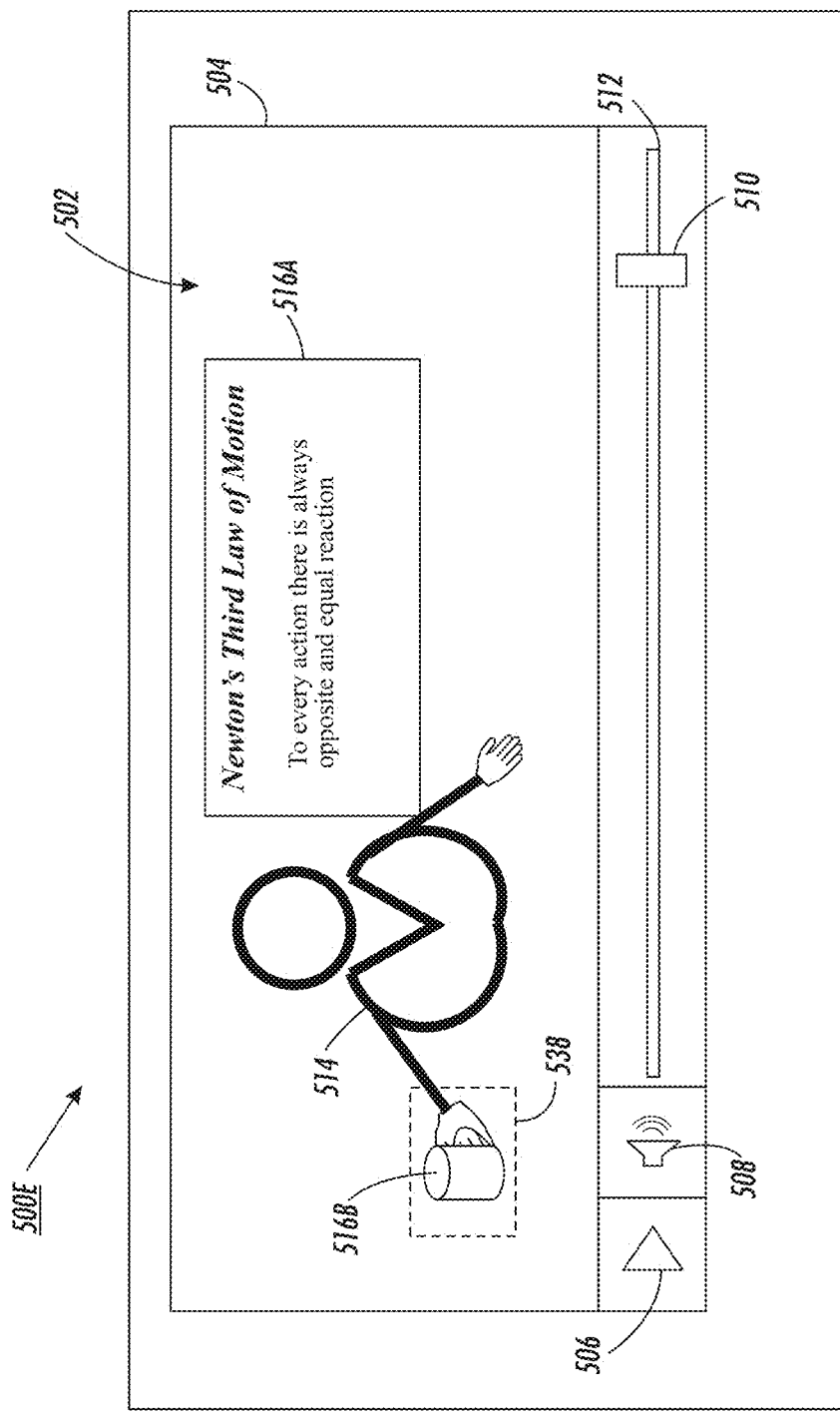

As shown in FIG. 5E, the UI 500E depicts a frame of the multimedia content 502 that includes the human object 514 (e.g., the teacher), the first inanimate object 516A (e.g., the presentation slide), and a second inanimate object 516B (e.g., a prop such as a cup/mug). Further, as shown FIG. 5E, the human object 514 holds (depicted by 538) the second inanimate object 516B (e.g., the prop such as the cup/mug). Thus, in the current scenario, the interaction information associated with the multimedia content 502 may be indicative of the human object 514 interacting with the second inanimate object 516B by holding (depicted by 538) the second inanimate object 516B.

A person skilled in the art will understand that the UIs 500A, 500B, 500C, 500D, and 500E are for illustrative purposes and should not be construed to limit the scope of the disclosure.

Various embodiments of the disclosure encompass numerous advantages including methods and systems for indexing multimedia content. As disclosed above, the multimedia content is analyzed to determine a body language information pertaining to a human object in the multimedia content. Further, the multimedia content is analyzed to determine an interaction information, indicative of an action performed by the human object on an inanimate object in the multimedia content. Thereafter, the multimedia content may be indexed in the content repository 106 based at least on the body language information and the interaction information. Indexing the multimedia content based on the body language information and the interaction information may enable a user of the user-computing device 108 to search for a desired multimedia content from the content repository 106 using the body language information and the interaction information. For instance, the user may search for a multimedia content having a human object with a positive body language (e.g., frequent use of hand gestures, open body posture, good eye contact, and so on.). Further, the user may wish to retrieve such multimedia content in which the human object interacts more frequently with the inanimate object (for instance, the human object writing, highlighting, or modifying text on the inanimate object). Viewing such multimedia content may benefit the user more as the user may be able to better understand concepts explained in the multimedia content by the human object.

Further, as discussed above, the multimedia content may be analyzed to determine various other factors such related to the multimedia content such as, but not limited to, an emotion information, an audio characteristics information (e.g., a speaking rate, an accent, a speaking style, a background music/audio, a background noise, and so on), a discourse rate, concepts/no. of repetitions of the concepts explained in the multimedia content, and a personality type of the human object. The multimedia content may be further indexed in the content repository 106 based on one or more of (or any combination of) the other factors enlisted above. Hence, this may enable the user of the user-computing device 108 to retrieve a desired multimedia content using one or more of the aforementioned factors. For instance, the user may wish to retrieve multimedia content in which the human object has a US English accent, speaks fluently, and at a medium speaking rate.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic". Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for indexing a multimedia content have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for indexing multimedia content within an educational environmental, the method comprising:
    extracting, by one or more processors, a set of frames from the multimedia content, wherein the set of frames comprises at least one of a human object and an inanimate object;
    determining, by the one or more processors, a body language information pertaining to the human object from the set of frames by utilizing one or more image processing techniques;
    determining, by the one or more processors, interaction information from the set of frames, wherein the interaction information is indicative of an action performed by the human object on the inanimate object; and
    indexing, by the one or more processors, the multimedia content in a content database based at least on the body language information and the interaction information, wherein
    the indexing of the multimedia content is further based on emotion information, audio characteristics information, discourse rate, one or more concepts in the multimedia content, number of repetitions of the one or more concepts, and personality type of the human object.

2. The method of claim 1, further comprising:
    analyzing, by the one or more processors, the multimedia content to determine the emotion information by utilizing one or more of one or more image processing techniques, one or more speech/audio processing techniques, or one or more natural language processing techniques, wherein
    the emotion information is indicative of an emotion presented by the human object in the multimedia content.

3. The method of claim 1 further comprising analyzing, by the one or more processors, an audio content within the multimedia content to determine the audio characteristics information by utilizing one or more speech/audio processing techniques, wherein
    the audio characteristics information comprises one or more of a speech rate, an accent, a speaking style, a background audio, or a background noise.

4. The method of claim 1, further comprising
    determining, by the one or more processors, a first textual content from the multimedia content by utilizing one or more text recognition techniques, wherein
    the first textual content comprises one or more of a textual content located on the inanimate object or a close-captioned text within the multimedia content.

5. The method of claim 4, further comprising:
    determining, by the one or more processors, a second textual content from an audio content within the multimedia content, by utilizing one or more speech-to-text conversion techniques.

6. The method of claim 5 further comprising
    determining, by said one or more processors, the discourse rate associated with the multimedia content based on the first textual content and the second textual content.

7. The method of claim 5, further comprising
    extracting, by the one or more processors, one or more keywords from the first textual content and the second textual content by utilizing one or more natural language processing techniques, wherein
    the one or more keywords relate to the one or more concepts explained in the multimedia content.

8. The method of claim 7, further comprising
    determining, by the one or more processors, a number of repetitions of the one or more concepts in the multimedia content.

9. The method of claim 8, wherein the multimedia content is further indexed based the number of repetitions of the one or more concepts in the multimedia content.

10. The method of claim 7, further comprising
    determining, by the one or more processors, the personality type associated with the human object based on one or more of the body language information, the interaction information, the emotion information indicative of an emotion presented by the human object in the multimedia content, a speech rate of said human object, a speaking style of said human object, or the second textual content determined from an audio content within the multimedia content.

11. The method of claim 1, wherein the multimedia content comprises one or more of an educational lecture, a corporate e-learning module (ELM), or a marketing/promotional video.

12. The method of claim 1, wherein the inanimate object comprises one or more of a presentation slide, a writing board, a poster, a paper, or a prop/model.

13. The method of claim 12, wherein the action performed by the human object on the inanimate object includes one or more of:
the human object writing on the inanimate object,
the human object pointing towards or touching the inanimate object, the human object holding the inanimate object,
the human object scrolling through a textual content on the inanimate object, or the human object modifying or highlighting the textual content on the inanimate object.

14. The method of claim 1, wherein the body language information is determined based on one or more of a hand motions of the human object in the multimedia content, a body motion of the human object, a facial expression/emotion of the human object, a proximity of the human object to a video capturing device utilized for creation of the multimedia content, or an eye contact of the human object towards the video capturing device.

15. A system for indexing a multimedia content within an educational environment, the system comprising:
one or more processors configured to:
extract a set of frames from the multimedia content, wherein the set of frames comprises at least one of a human object and an inanimate object;
determine a body language information pertaining to the human object from the set of frames by utilizing one or more image processing techniques;
determine an interaction information from the set of frames, wherein the interaction information is indicative of an action performed by the human object on the inanimate object; and
index the multimedia content in a content database based at least on the body language information and the interaction information, wherein
the indexing of the multimedia content is further based on emotion information, audio characteristics information, discourse rate, one or more concepts in the multimedia content, number of repetitions of the one or more concepts, and personality type of the human object.

16. The system of claim 15, wherein the multimedia content includes one or more of an educational lecture, a corporate e-learning module (ELM), or a marketing/promotional video.

17. The system of claim 15, wherein the inanimate object comprises one or more of a presentation slide, a writing board, a poster, a paper, or a prop/model.

18. The system of claim 17, wherein the action performed by the human object on the inanimate object includes one or more of:
the human object writing on said inanimate object,
the human object pointing towards or touching said inanimate object, the human object holding the inanimate object,
the human object scrolling through a textual content on the inanimate object, or the human object modifying or highlighting the textual content on the inanimate object.

19. The system of claim 15, wherein the body language information is determined based on one or more of a hand motions of the human object in the multimedia content, a body motion of the human object, a facial expression/emotion of the human object, a proximity of said human object to a video capturing device utilized for creation of the multimedia content, or an eye contact of said human object towards the video capturing device.

20. A computer program product for use with a computing device, the computer program product comprising a non-transitory computer readable medium, the non-transitory computer readable medium stores a computer program code for indexing a multimedia content within an educational environment, the computer program code is executable by one or more processors in the computing device to:
extract a set of frames from the multimedia content, wherein the set of frames comprises at least one of a human object and an inanimate object;
determine a body language information pertaining to the human object from the set of frames by utilizing one or more image processing techniques;
determine an interaction information from the set of frames, wherein the interaction information is indicative of an action performed by the human object on the inanimate object; and
index the multimedia content in a content database based at least on the body language information and the interaction information, wherein
the indexing of the multimedia content is further based on emotion information, audio characteristics information, discourse rate, one or more concepts in the multimedia content, number of repetitions of the one or more concepts, and personality type of the human object.

* * * * *